(12) United States Patent
Nakamura et al.

(10) Patent No.: US 6,888,593 B1
(45) Date of Patent: May 3, 2005

(54) ANTI-GLARE AND ANTI-REFLECTION FILM, POLARIZING PLATE, AND IMAGE DISPLAY DEVICE

(75) Inventors: Kazuhiro Nakamura, Minami-ashigara (JP); Ichiro Amimori, Minami-ashigara (JP); Hirohisa Hokazono, Minami-ashigara (JP); Jun Watanabe, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/633,585

(22) Filed: Aug. 5, 2003

Related U.S. Application Data

(62) Division of application No. 09/671,679, filed on Sep. 28, 2000, now Pat. No. 6,693,746.

(30) Foreign Application Priority Data

| Sep. 29, 1999 | (JP) | ............................................ 11/277150 |
| Sep. 29, 1999 | (JP) | ............................................ 11/277207 |
| Sep. 29, 1999 | (JP) | ............................................ 11/277231 |
| Sep. 30, 1999 | (JP) | ............................................ 11/280884 |

(51) Int. Cl.$^7$ .......................................... G02F 1/1335
(52) U.S. Cl. ...................... 349/96; 349/137; 359/499
(58) Field of Search ..................... 349/137, 96, 117; 359/493, 499, 498, 500

(56) References Cited

U.S. PATENT DOCUMENTS

| 5,583,676 A | 12/1996 | Akiyama et al. |
| 5,583,679 A | 12/1996 | Ito et al. |
| 5,667,854 A | 9/1997 | Yamada |
| 5,925,438 A | 7/1999 | Ota et al. |
| 6,034,755 A | 3/2000 | Watanabe |
| 6,064,524 A | 5/2000 | Oka et al. |
| 6,330,108 B1 * | 12/2001 | Nishikouji et al. ......... 359/499 |
| 6,403,223 B1 * | 6/2002 | Albro et al. ................ 428/421 |
| 6,542,300 B2 * | 4/2003 | Umemoto ................... 359/491 |

FOREIGN PATENT DOCUMENTS

| EP | 0 645 258 | 12/1994 |
| EP | 0 667 541 | 2/1995 |
| EP | 0 756 191 | 7/1996 |
| EP | 0 778 476 | 12/1996 |
| EP | 0 783 128 | 7/1997 |
| JP | 07-287102 | 10/1995 |
| JP | 07-333404 | 12/1995 |
| JP | 11-095011 | 4/1999 |
| WO | WO 98/45734 | 10/1998 |

* cited by examiner

*Primary Examiner*—James A. Dudek
(74) *Attorney, Agent, or Firm*—Burns, Doane, Swecker & Mathis, L.L.P.

(57) ABSTRACT

There is disclosed an anti-glare and anti-reflection film, which has a transparent support, and at least one low-refractive-index layer that comprises a fluorine-containing resin and has a refractive index in the range from 1.38 to 1.49, wherein the film comprises an anti-glare layer that is disposed between the support and the low-refractive-index layer and that contains a binder having a refractive index in the range from 1.57 to 2.00. The anti-glare and anti-reflection film, which has sufficient anti-reflection property, resistance to damage, and stain-proofing property, and free from uneven color, can be produced simply and inexpensive manner. There is also disclosed a polarizing plate and an image display device, each utilizing the anti-glare and anti-reflection film.

22 Claims, 8 Drawing Sheets

ANTI-GLARE AND ANTI-REFLECTION FILM, POLARIZING PLATE, AND IMAGE DISPLAY DEVICE

This application is now a divisional of application Ser. No. 09/671,679, filed on Sep. 28, 2000, now U.S. Pat. No. 6,693,746.

FIELD OF THE INVENTION

The present invention relates to an anti-reflection (reflective) film having anti-glare capability, and also to a polarizing plate and a liquid crystal display device using the film.

Further, the present invention relates to a polarizing plate having optical compensation capacity and anti-reflection capability, and to a liquid crystal display device and a color liquid crystal display device using the polarizing plate.

BACKGROUND OF THE INVENTION

FIG. 3 shows the structure of a conventional liquid crystal display device. In a general liquid crystal display device, an edge-light-type back light 211 is disposed on the outermost backface; and a light conductive plate 212, which emits the light of the back light toward the surface, and a light-scattering sheet 213, which makes the brightness of the light uniform, and one or plurality of light-adjusting sheets 214, having the ability to condense the light made uniform by the light-scattering sheet, in a predetermined direction, or the ability to selectively transmit or reflect a specific polarized light, are disposed, in this order, from the backface. The light passing through these films is incident to a liquid crystal cell 217, which is held between a pair of polarizing plates 215 and 216. 218 represents a cool fluorescent cathode ray tube as a light source, and 219 represents a reflection sheet. Herein, in the drawings, the same numeral represents the same member.

The anti-reflection film is usually disposed on the outermost surface of a display, which decreases the reflection of external light by using the principle of optical interference in an image display device, such as a cathode ray tube display device (CRT), a plasma display panel (PDP), and a liquid crystal display device (LCD). Namely, as an anti-reflection layer, an anti-reflection film is disposed on the display side of the polarizing plate 216 in FIG. 3.

However, in the anti-reflection film provided with only a hardcoat layer and a low-refractive-index layer on a transparent support, the low-refractive-index layer must be made to have a sufficiently lowered refractive index, to lower the reflectance. In order to decrease the average specular reflectance of, for example, an anti-reflection film using triacetyl cellulose as the support and a UV-cured coating of dipentaerythritol hexaacrylate as the hardcoat layer, to 1.6% or less, in a wavelength range between 450 nm and 650 nm, the refractive index of such a low-refractive-index layer must be 1.40 or less. Examples of materials having a refractive index of 1.40 or less include inorganic materials, such as magnesium fluoride and calcium fluoride, and organic materials, such as fluorine-containing compounds having a high fluorine content. However, these fluorine compounds lack in mechanical strength and abrasion-resistance needed for the layer disposed on the outermost surface of a display. It is therefore conventionally necessary to use a compound having a refractive index of 1.43 or more, to insure sufficient resistance to damage (abrasion).

JP-A-7-287102 ("JP-A" means unexamined published Japanese patent application) describes that the reflectance is reduced by making the refractive index of the hardcoat layer high. However, a hardcoat layer having such a high refractive index causes uneven color on the film, because of a large difference in refractive index between the hardcoat layer and a support, and the wavelength dependency of the reflectance is thereby largely fluctuated resultantly.

JP-A-7-333404 describes an anti-glare and anti-reflection film that is superior in gas barrier capability, anti-glare capability, and anti-reflection capability. However, because a silicon oxide film produced by chemical vapor deposition (CVD) is essential, the method to produce such a film is inferior in productivity to wet application.

In the meantime, the display type of LCD can roughly be classified into a birefringence mode and an optical rotation mode. A super twisted nematic liquid crystal display device utilizing the birefringence mode (referred to hereinafter as STN-LCD) employs super twisted nematic liquid crystal possessing a twisted angle exceeding 90° and steep electrooptical characteristics. Therefore, STN-LCD enables display of a large capacity due to multiplex drive. However, STN-LCD has problems such as a slow response (several hundred milliseconds) and difficulty in gradation display, and is inferior in display characteristics, as compared with those of a liquid crystal display device using active element (such as TFT-LCD and MIM-LCD).

In TFT-LCD and MIM-LCD, a twisted nematic liquid crystal possessing a twisted angle of 90° and a positive birefringence is used for displaying images. These are a display mode of TN-LCD, which is an optical rotation mode. As this mode obtains a high responsibility (several ten milliseconds) and a high contrast, this mode is advantageous in many aspects as compared with the birefringence mode. Since TN-LCD changes display colors and display contrast according to a viewing angle of looking at the liquid crystal display device (viewing angle characteristics), it involves a problem that the device is difficult in watching as compared with CRT.

JP-A-4-229828 and JP-A-4-258923 respectively disclose a proposal of providing a phase differential plate (optical compensative sheet) between a liquid crystal cell and a pair of polarizing plate for improving viewing angle characteristics. As the phase differential plate proposed in the aforesaid publications has a phase difference of almost zero (0) in the vertical direction to the liquid crystal cell, it gives no optical effect on direct front but a phase difference is realized when it is tilted. A phase difference generated in an inclined direction for the liquid crystal cell is thereby compensated. A sheet having a negative birefringence so as to compensate a positive birefringence of a nematic liquid crystal and having an inclined optic axis is effective for such optical compensative sheet.

JP-A-6-75115 and EP 0576304A1 respectively disclose an optical compensative sheet having a negative birefringence and an inclined optic axis. This sheet is manufactured by stretching a polymer such as polycarbonate or polyester, and has a main-refractive-index direction inclined to the normal line thereof. As such sheet requires an extremely complicate stretching treatment, therefore, it is extremely difficult to manufacture a uniform optical compensative sheet of a large area stably according to this method.

On the other hand, JP-A-3-9326 and JP-A-3-291601 respectively disclose a method using a liquid crystal polymer. An optical compensative sheet is thereby obtained by applying a liquid crystal polymer onto the surface of an alignment (oriented) layer on a support. However, as the liquid crystal polymer fails to show a satisfactory alignment on the alignment layer, it is impossible to enlarge the viewing angle in all directions. Further, JP-A-5-215921 discloses an optical compensative sheet (birefringent plate) that comprises a support and a liquid crystal polymeric bar-type compound having a positive birefringence. This optical compensative sheet is obtained by applying a solution of the polymeric bar-type compound onto the support and curing the compound under heating. However, the liquid crystal polymer is devoid of birefringence so that it is unable to enlarge the viewing angle in all directions.

In JP-A-8-50206, there is disclosed an optical compensative sheet characterized by a layer of a negative birefringence comprised of a compound having a discotic structure unit, wherein an angle between the discotic compound and a support is changed with respect to the direction of the depth of the layer. According to the method described therein, a viewing angle viewed from contrast is extensively enlarged in all directions and deterioration of image quality such as yellowing viewed from an incline direction is scarcely observed. With the optical compensative sheet alone, however, a deterioration in display quality based on reflection of outside light as mentioned above, cannot be improved. Thus, further improvement is required.

SUMMARY OF THE INVENTION

An object of the present invention is to provide an anti-glare and anti-reflection film that is simple and inexpensive, that has sufficient anti-reflection capability, resistance to damage, and stainproofing capability, and that is less in uneven color, by forming only an anti-glare hardcoat layer and a low-refractive-index layer on a support. Another object of the present invention is to provide a polarizing plate that has sufficient anti-reflection capability, resistance to damage, and stainproofing capability, and that is less in uneven color. Still another object of the present invention is to provide a liquid crystal display device (a liquid crystal display-type image display device), in which an anti-refractive layer that is the outermost layer of the display is high in anti-reflection capability, resistance to damage, and stainproofing capability, and is less in uneven color.

Further another object of the present invention is to provide a liquid crystal display device, having excellent display quality in all directions, by preventing a deterioration in display quality based on reflection of outside light, and by enlarging a viewing angle of a liquid crystal display device and a color liquid crystal display device of TN mode. A still further object of the present invention is to provide such a device at a low price, by producing it stably in a simple manner.

Other and further objects, features, and advantages of the invention will appear more fully from the following description, taken in connection with the accompanying drawings.

DETAILED DESCRIPTION OF THE INVENTION

Figure 1:
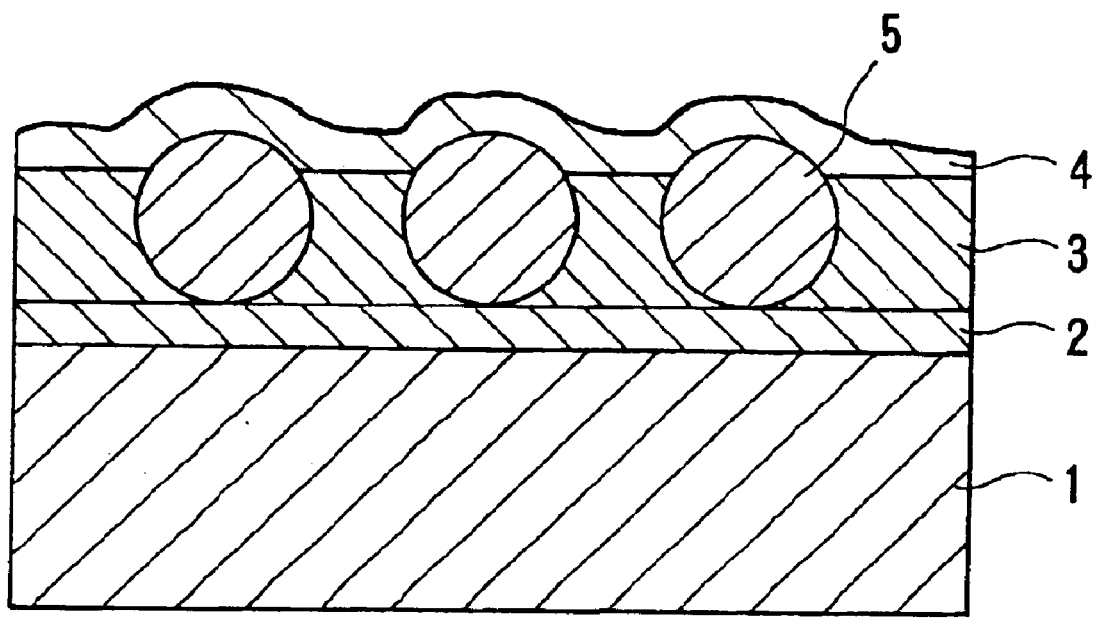
FIG. 1 is a sectional view of an example of an anti-glare and anti-reflection film of the present invention.

The present inventors found that the above objects of the present invention can be attained by the following means.

(1) An anti-glare and anti-reflection film, which has a transparent support, and at least one low-refractive-index layer comprising a fluorine-containing resin and having a refractive index ranging from 1.38 to 1.49, wherein the anti-glare and anti-reflection film comprises an anti-glare layer that is disposed between the transparent support and the low-refractive-index layer and that contains a binder having a refractive index ranging from 1.57 to 2.00.

(2) The anti-glare and anti-reflection film according to the above (1), wherein said low-refractive-index layer contains a cured product that is cured by heat or ionizing radiation.

(3) The anti-glare and anti-reflection film according to the above (2), wherein said low-refractive-index layer has a dynamic friction coefficient of 0.03 to 0.15 and a contact angle of 90 to 120 degrees with water.

(4) The anti-glare and anti-reflection film according to the above (3), wherein said low-refractive-index layer contains ultra-fine particles of an inorganic oxide.

(5) The anti-glare and anti-reflection film according to any one of the above (1) to (4), wherein said anti-glare layer comprises a binder containing matt fine particles and a cured product of a thermoplastic or ionizing radiation-curable resin.

(6) The anti-glare and anti-reflection film according to the above (5), wherein in said anti-glare layer, the average particle diameter of said matt fine particles is in a range between 1 to 10 $\mu$m.

(7) The anti-glare and anti-reflection film according to the above (5), wherein said binder of the anti-glare layer is a heat- or ionizing radiation-cured product of a mixture of a high-refractive-index monomer and a tri- or more-functional (meth)acrylate monomer.

(8) The anti-glare and anti-reflection film according to the above (5), wherein said binder of the anti-glare layer is a heat- or ionizing radiation-cured product of a mixture of ultra-fine particles of an oxide of at least one metal selected from Al, Zr, Zn, Ti, In, Sn and Sb and a tri- or more-functional (meth)acrylate monomer.

(9) The anti-glare and anti-reflection film according to the above (5), wherein said binder of the anti-glare layer contains ultra-fine particles of an oxide of Zr, and an acrylate monomer mixture containing dipentaerythritol pentaacrylate and dipentaerythritol hexaacrylate.

(10) A polarizing plate, comprising the anti-glare and anti-reflection film according to any one of the above (1) to (9), as at least one of two protective films of a polarizing layer in the polarizing plate.

(11) A liquid crystal display device, which comprises the anti-glare and anti-reflection film according to any one of the above (1) to (9) or an anti-reflection layer of the anti-glare and anti-reflection polarizing plate according to the above (10), with its anti-reflection layer being used as the outermost layer of the surface of the display.

(12) A polarizing plate, which has a polarizing layer held between two transparent supports, and which comprises an optical compensation layer containing an optically anisotropic layer on one support among the transparent supports on the side opposite to the polarizing layer, and which comprises at least one anti-glare layer and at least one low-refractive-index layer in this order from the support side on another transparent support on the side opposite to the surface which is in contact with the polarizing layer, wherein the optically anisotropic layer is a layer which comprises a compound having a discotic structure unit and has a negative birefringence, in which the disc planes of the discotic structure units are inclined to the surface of the transparent support at angles changing successively along the normal direction through the optically anisotropic layer.

(13) The polarizing plate according to the above (12), wherein the angles increase with the increase in distance of the optical anisotropic layer from the surface side of the support.

(14) The polarizing plate according to the above (12), wherein the optically anisotropic layer further contains a cellulose ester.

(15) The polarizing plate according to the above (12), wherein the transparent support on the side of the optically anisotropic layer has an optically negative uniaxiality, and has an optical axis in the normal direction of the surface of the transparent support, and satisfies the following equation:

$$20 \leq \{(nx+ny)/2-nz\} \times d \leq 400$$

wherein d represents a thickness of the optical compensative layer (unit: nm), nx, ny, and nz represent main refractive indices of three orthogonal axes of the optical compensative layer, nz represents a main refractive index in the direction of thickness of the transparent support, and the axes satisfy a relation of $nx \leq nz \leq ny$, when it is viewed from the front.

(16) The polarizing plate according to the above (12), wherein an alignment layer is formed between the optically anisotropic layer and the transparent support.

(17) The polarizing plate according to the above (16), wherein the alignment layer comprises a film made of a cured polymer.

(18) The polarizing plate according to the above (12), wherein the optically anisotropic layer is a mono-domain or is formed of a number of domains having a size of 0.1 μm or less.

(19) A polarizing plate, wherein one of two protective films of the polarizing plate of the above (10) is said anti-glare and anti-reflection film, and another protective film comprises an optical compensation layer containing an optically anisotropic layer on the support of said protective film on the side opposite to the support surface which is in contact with the polarizing layer, and wherein the optically anisotropic layer is a layer which comprises a compound having a discotic structure unit and has a negative birefringence, in which the disc planes of the discotic structure units are inclined to the surface of the transparent support at angles changing successively along the normal direction through the optically anisotropic layer.

(20) A liquid crystal display device comprising the polarizing plate in any one of the above (12) to (19) as a display side polarizing plate among two polarizing plates disposed on both sides of a liquid crystal cell, in which the optically anisotropic layer is disposed towards the liquid crystal cell side.

(21) A color liquid crystal display device, which comprises a liquid crystal cell comprising a pair of substrates provided with a transparent electrode, a pixel electrode and a color filter, and a twisted nematic liquid crystal that is sealed between the pair of substrates, a pair of optical compensation sheets disposed on both sides of the liquid crystal cell, and a pair of polarizing plates disposed outside of the compensation sheets, wherein the polarizing plate as stated in any one of the above (12) to (19) is used, as the polarizing plate and the optical compensation sheet on the display side of the liquid crystal cell, in which the optically anisotropic layer is disposed towards the liquid crystal cell side, and wherein as the optical compensation sheet on the back light side of the liquid crystal cell, an optical compensation sheet provided with an optically anisotropic layer that comprises a compound having a discotic structure unit and has a negative birefringence is used, in which the disc planes of the discotic structure units are inclined to the surface of the transparent support at angles changing successively along the normal direction through the optically anisotropic layer.

As preferable embodiments of the anti-glare and anti-reflection film of the present invention, the following ones can be mentioned.

(22) An anti-glare and anti-reflection film, comprising, on a transparent support, an anti-glare hardcoat layer, and a low-refractive-index layer having a refractive index ranging from 1.38 to 1.49 on the anti-glare hardcoat layer, wherein the anti-glare hardcoat layer contains particles having an average particle diameter of 1.0 to 10.0 μm the low-refractive-index layer contains inorganic fine particles, and a fluorine-containing compounds being crosslinked by means of heat or ionizing radiation, and having dynamic friction coefficient of 0.03 to 0.15 and a contact angle of 90 to 120 degrees with water, and the optical film has haze of 3.0 to 20.0%, and an average specular reflectance of 1.8% or less in a wavelength range of 450 to 650 nm.

(23) An anti-glare and anti-reflection film, which comprises, on a substrate, at least one low-refractive-index layer being composed of a fluorine-containing resin and having refractive index of 1.38 to 1.49, wherein, between the substrate and the low-refractive index layer, an anti-glare layer that contains a binder having the refractive index of 1.57 to 2.00 is provided directly on the substrate.

These anti-glare and anti-reflection films stated in the above (22) and (23) can be preferably used in the polarizing plate stated in the above (10) and in the liquid crystal display device stated in the above (11), as an anti-glare and anti-reflection film.

Herein, the anti-glare and anti-reflection films as stated in the above (1) to (9), those stated in the above (22), and those stated in the above (23) are referred to as the first, second, and third embodiments of the anti-glare and anti-reflection film of the present invention, respectively. In the following description, the present invention means to include all of the above first, second, and third embodiments, unless otherwise specified.

Further, the optical anisotropic layer preferably satisfies the following conditions:

(1) The optical anisotropic layer, in which angles of disk surfaces of the discotic structure units with the surface of the transparent support are increased with the increase in distance from the surface of the support, and the angles vary in the range of 0° to 90°, and preferably 5° to 85°.

(2) The optical anisotropic layer having angles of disk surfaces of the discotic structure units with the surface of the transparent support, wherein the minimum value of the angles is within the range from 0 to 85° (more preferably, 5–40°), while the maximum value of the angles is within the range from 50 to 90° (more preferably, 30–85°).

(3) The optical anisotropic layer containing a cellulose ester (more preferably cellulose acetate butylate).

(4) The optical anisotropic layer having the minimum value in the absolute value of retardation other than zero in the direction incline from the normal line of the polarizing plate.

(5) The optical anisotropic surface, in which the substrate of the liquid crystal cell has an alignment surface subjected to a rubbing treatment in one direction, as well as the optical anisotropic layer is arranged in such manner that an angle of the direction, in case of positively projecting the direction of the minimum value of retardation of the optical anisotropic layer on the liquid crystal cell, with the rubbing direction of the substrate of the liquid crystal cell adjacent to the optical anisotropic layer, is 90–270°.

The fundamental structure of an anti-glare and anti-reflection film preferable as one embodiment of the present invention will be explained with reference to the drawings.

The embodiment whose cross-sectioned view is shown in FIG. 1 is an example of the anti-glare and anti-reflection film of the present invention and has a layer structure in which a transparent support 1 made of, for example, a triacetyl cellulose, a hardcoat layer 2, an anti-glare layer 3 (that may be referred to as an anti-glare hard coat layer when the anti-glare layer also has hard-coat property), and a low-refractive index-layer 4 are laminated in this order. 5 represents an anti-glare particle wholly covered with the binder of the anti-glare layer 3 that is coated with the low-refractive-index layer 4. The refractive index of the low-refractive-index layer 4 is generally 1.38 to 1.49, and preferably 1.43 to 1.48.

In the anti-reflection film, the refractive index and the layer thickness of the low-refractive-index layer preferably fulfill the following formula (I) respectively:

$$m\lambda/4 \times 0.7 < n_1 d_1 < m\lambda/4 \times 1.3 \qquad (I)$$

wherein m is a positive odd number (generally 1), n, is the refractive index of the low-refractive-index layer, d is the thickness (nm) of the low-refractive-index layer, and X is a wavelength of the rays to be used.

Figure 2:
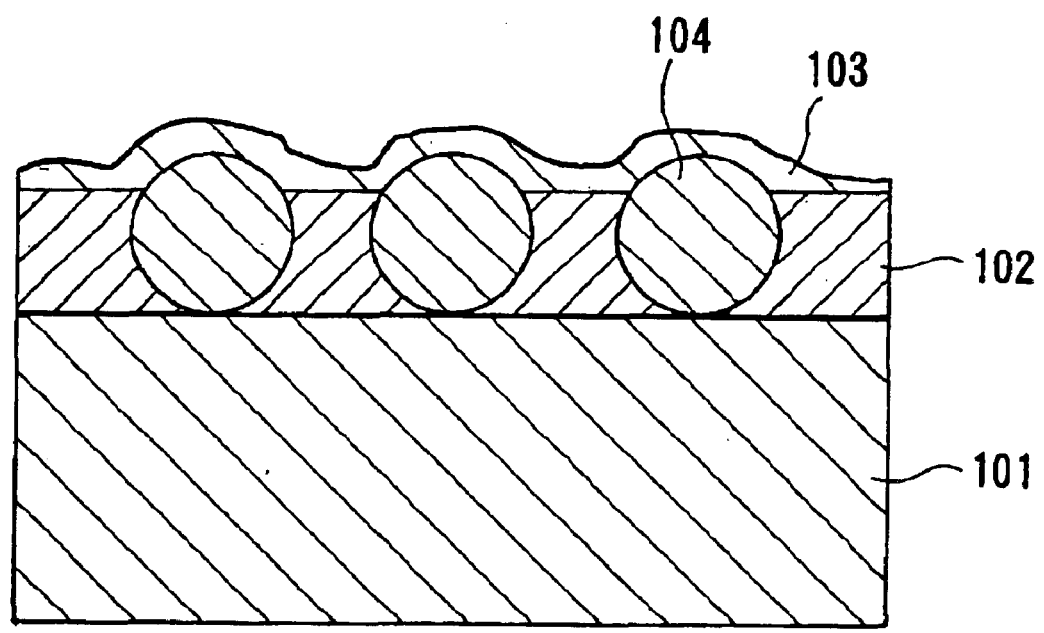
FIG. 2 is a sectional schematic view showing layer constitution of another example of an anti-glare and anti-reflection film.
Figure 3:
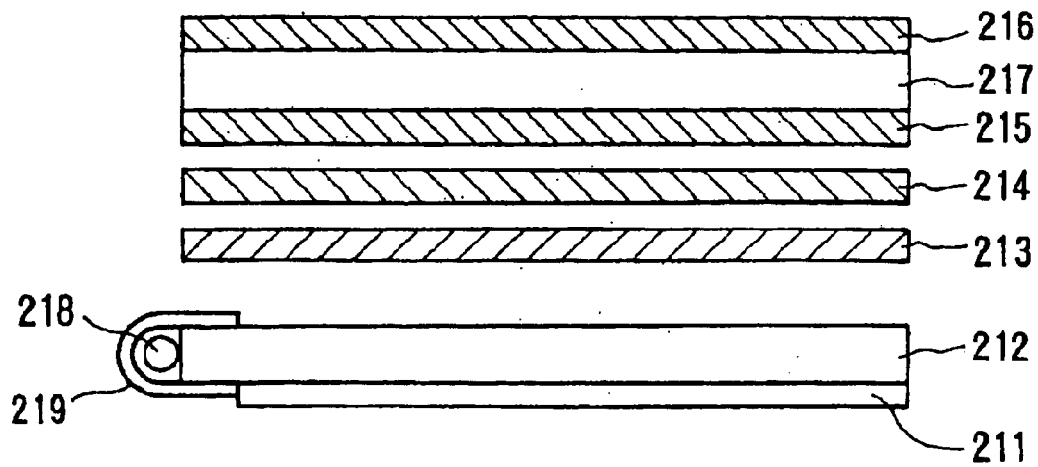
FIG. 3 is a drawing showing a representative structure of a conventional liquid crystal display device.

The embodiment whose cross-sectional view is shown in FIG. 2 is another example of the anti-glare and anti-reflection film of the present invention and has a layer structure in which a transparent support 101 made of, for example, a triacetyl cellulose, an anti-glare layer 102, and a low-refractive index layer 103 are laminated in this order. 104 represents matte fine particle. The refractive index of the anti-glare layer is 1.57 to 2.00 and the refractive index of the low-refractive-index layer is 1.38 to 1.49.

In the anti-reflection film, the low-refractive-index layer preferably fulfills the above formula (I) respectively.

The refractive index of the low-refractive-index layer is preferably 1.43 to 1.48. If the refractive index is excessively small, film strength is weakened and resistance to damage is reduced. On the other hand, if the refractive index is excessively large, anti-reflection capability is lowered.

The refractive index of the anti-glare hardcoat layer in the present invention is not expressed by one value, but the layer is a layer having ununiform refractive indexes in which fine particles are dispersed in materials forming the anti-glare hardcoat layer.

In the present invention, the refractive index of a material (binder section, i.e., materials in the portion other than particle 5 in the anti-glare layer 3) for forming the anti-glare layer is preferably 1.57 to 2.00, more preferably 1.57 to 1.80, and further preferably 1.60 to 1.80. The refractive index of triacetyl cellulose used preferably as the substrate (support) is 1.48. The refractive index of the binder used to form the anti-glare layer for use in the present invention is 1.57 to 2.00. If the refractive index is too low or too high, the anti-reflection capability is decreased. In such a binder, when the high-refractive-index material comprises a monomer having two or more ethylenically unsaturated group and fine particles having a particle diameter of 100 nm or less composed of at least one oxide of a metal selected from titanium, aluminum, indium, zinc, tin, antimony and zirconium, no light scattering is caused because the particle diameter of the fine particle is sufficiently smaller than the wavelength of light, and hence the high-refractive-index material behaves as an optically uniform material. This fact is described in JP-A-8-110401.

In the present invention, the anti-glare layer causes surface scattering by anti-glare particles (matt fine particles) dispersed in the aforementioned high-refractive-index material and hence no effect of optical interference in the anti-glare layer is caused. In the high-refractive-index hardcoat layer containing no anti-glare particle, a large fluctuation of refractive index is observed as to the wavelength dependency of refractive index on account of optical interference due to a difference in refractive index between the hardcoat layer and the substrate, with the result that the effect of preventing anti-glare reflection is decreased and at the same time, uneven color is caused. However, in the anti-glare and anti-reflection film of the present invention, these problems are solved by the scattering effect due to the surface roughness (irregularities) of the anti-glare layer.

As the substrate used in the present invention, preferable one is selected according to its use, specifically a transparent support is used.

As the transparent support, preferably a plastic film is used. Examples of a polymer used to form the plastic film include cellulose esters (e.g., triacetyl cellulose and diacetyl cellulose), polyamides, polycarbonates, polyesters (e.g., polyethylene terephthalate and polyethylene naphthalate), polystyrenes, and polyolefins. Among these compounds, triacetyl cellulose, polyethylene terephthalate and polyethylene naphthalate are preferable, and triacetyl cellulose is particularly preferable. When the anti-glare and anti-reflection film of the present invention is used for a liquid crystal display device, it is disposed on the outermost layer of the display by providing an adhesive layer on one surface. When the transparent support is triacetyl cellulose, because triacetyl cellulose is used as a protective film which protects a polarizing layer of a polarizing plate, it is preferable in view of cost to use the anti-glare and anti-reflection film of the present invention as it is as the protective film.

The anti-glare and anti-reflection film of the present invention comprises the anti-glare hardcoat layer on the transparent support and the low-refractive-index layer on the hardcoat layer, and a hardcoat layer may be disposed under the anti-glare hardcoat layer according to need.

The compound to be used as a binder in an anti-glare layer or its under layer, a hardcoat layer, is preferably a polymer having a main chain of saturated hydrocarbon or polyether, more preferably a polymer having a main chain of saturated hydrocarbon. The binder polymer is preferably cross-linked. The polymer having a main chain of saturated hydrocarbon is preferably prepared by polymerization of an ethylenically unsaturated monomer(s). For preparing a cross-linked binder polymer, a monomer having two or more ethylenically unsaturated groups is preferably used. In order to obtain high refractive index, at least one type selected from the group consisting of an aromatic ring, halogen atom except for a fluorine atom, sulfur atom, phosphorous atom and nitrogen atom is preferably contained in the structure of the monomer.

Examples of the monomer having two or more ethylenically unsaturated groups include esters of a polyhydric alcohol and a (meth)acrylic acid (e.g., ethyleneglycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri (meth)acrylate, dipentaerythriytol tetra(meth)acrylate, dipentaerythriytol penta(meth)acrylate, dipentaerythriytol hexa (meth)acrylate, 1,2,3-cyclohexane tetramethacrylate, polyurethane polyacrylate, polyester polyacrylate), vinyl benzene and its derivatives (e.g., 1,4-divinylbenzene, 4-vinylbenzoic acid-2-acryloylethylester, 1,4-divinylcyclohexanone), vinylsulfones (e.g., divinylsulfone), acrylamides (e.g., methylene-bis-acrylamide) and methacrylamides.

Examples of the high-refractive-index monomer include bis(4-methacryloylthiophenyl)sulfide, vinylnaphthalene, vinylphenylsulfide and 4-methacryloxyphenyl-4'-methoxyphenyl thioether.

The polymer having a main chain of polyether is preferably synthesized by ring-opening polymerization of a polyfunctional epoxy compound.

It is necessary to cure each of these monomers having an ethylenically unsaturated group by a polymerization reaction by means of ionizing radiation or heat after it is applied. This may be carried out using a photopolymerization initiator and a light-sensitizer as required according to the well-known method.

In place of or in addition to the monomer having two or more ethylenically unsaturated groups, crosslinked structure may be introduced into the binder polymer by the reaction of a compound having a crosslinkable group. Examples of the cross-linkable functional group include an isocyanate group, epoxy group, aziridine group, oxazoline group, aldehyde group, carbonyl group, hydrazine group, carboxyl group, methylol group, and active methylene group. Vinylsulfonic acid, acid anhydrides, cyanoacrylate derivatives, melamine, etherified methylol, esters and urethane, metal alkoxides such as tetramethoxysilan can also be used as a monomer to introduce the cross-linked structure. The functional groups, which exhibit cross-linking properties as a result of decomposition reaction, such as blocked isocyanate group, are also usable. Further, the term "crosslinkable group" in this specification is not restricted to the above-mentioned compounds, but can be a group, which exhibits a reactivity as a result of decomposition reaction of the functional group, as mentioned above. It is necessary to cure each of these compounds having a crosslinkable group by heat or the like after it is applied.

In the present invention, the anti-glare layer may be formed using a high-refractive-index monomer or high-refractive-index inorganic ultra-fine particles, in addition to a material for forming the aforementioned hardcoat layer in the formation of the binder.

Such a high-refractive-index monomer preferably contains at least one member selected from the group consisting of an aromatic ring, halogen atom except for a fluorine atom, sulfur atom, phosphorous atom and nitrogen atom, in the structure of the monomer. Examples of such a high-refractive-index monomer include bis(4-methacryloylthiophenyl)sulfide, vinylnaphthalene, vinylphenylsulfide and 4-methacryloxyphenyl-4'-methoxyphenyl thioether. In the present invention, the amount of the high-refractive-index monomer to be used is controlled such that the binder has a target refractive index of a film. Preferably the high-refractive-index inorganic ultra-fine particles contain ultra-fine particles having a particle diameter of 100 nm or less and preferably 50 nm or less and comprising at least one oxide of a metal selected from titanium, aluminum, indium, zinc, tin, antimony and zirconium. Examples of such a ultra-fine particle include $TiO_2$, $Al_2O_3$, $In_2O_3$, $ZnO$, $SnO_2$, $Sb_2O_3$, ITO (tin-containing indium oxide) and $ZrO_2$.

The content of the inorganic ultra-fine particle in the binder is preferably 10 to 90% by weight, more preferably 20 to 80% by weight, and further preferably 30 to 60% by weight, based on the total amount of the anti-glare layer.

In the anti-glare layer, anti-glare particles (matt fine particles) made of a resin or an inorganic compound may be used for the purpose of preventing the deterioration of reflectance and uneven color caused by the provision of anti-glare capability and the interference of a hardcoat layer.

Given as examples of such a particle of a resin or an inorganic compound are particles of a crosslinkable acrylic resin, crosslinkable polystyrene, melamine formaldehyde resin, benzoguanamine resin, aluminum oxide, titanium dioxide, and silicon oxide (silica).

Also, as the shape of the particle, any one of a sphere and an undefined shape may be used. Two or more different particles may be used in combination.

The average particle diameter of the anti-glare particles is preferably 1.0 to 10.0 $\mu$m, more preferably 1.5 to 7.0 $\mu$m, and further preferably 1.5 to 5.0 $\mu$m.

Preferably the content of anti-glare particles having a particle diameter smaller than the film thickness of the binder of the anti-glare layer is less than 50% by weight in the total anti-glare particles.

The amount of the anti-glare particles to be applied is preferably 10 to 1,000 mg/m² and more preferably 30 to 100 mg/m². The particle size distribution may be measured by a Coulter counter method or a centrifuging sedimentation method (decanting method) provided that it is examined by converting it into the distribution of the number of particles. The film thickness of the anti-glare layer is preferably 0.5 to 10 $\mu$m and more preferably 1 to 5 $\mu$m.

It is preferable that a difference in refractive index between the binder of the anti-glare layer and the anti-glare particles be less than 0.05 to decrease internal scattering in the anti-glare layer.

In the second embodiment of the anti-glare and anti-reflection film of the present invention, preferably the content of particles having a particle diameter larger than half (½) of the film thickness of the anti-glare hardcoat layer is 40 to 100% in the total particles. The particle size distribution may be measured by a Coulter counter method or a decanting method provided that it is examined by converting it into the distribution of the number of particles. The film thickness of the anti-glare hardcoat layer is preferably 1 to 10 $\mu$m and more preferably 1.2 to 6 $\mu$m.

In the present invention, the resin used for the anti-glare hardcoat layer and the fine particle used to increase the refractive index are the same as those exemplified for the hardcoat layer.

In the low-refractive-index layer, a fluorine-containing resin can be used and a fluorine-containing compound (resin) which is crosslinked by heat or ionizing radiation is preferably used. The refractive index of the low-refractive-index layer is generally 1.38 or more and 1.49 or less. When the refractive index is excessively low, the film strength is reduced whereas when the refractive index is excessively high, the anti-reflection capability is impaired. Also, the dynamic friction coefficient of this layer is preferably 0.03 to 0.15 and more preferably 0.07 to 0.10. An excessively small dynamic friction coefficient poses the problem of the slip of a handling film whereas an excessively large dynamic friction coefficient impairs resistance to damage. The contact angle of the low-refractive-index layer with water is preferably 90 to 120 degrees and more preferably 100 to 120 degrees. When the contact angle is excessively small, the stainproofing capability becomes inferior.

For the formation of the low-refractive-index layer, a fluorine-containing compound which has a dynamic friction coefficient of 0.03 to 0.15, a contact angle of 90 to 120 degrees with water and is crosslinkable by heat or ionic radiation, and inorganic fine particles are preferably used. If the dynamic friction coefficient of the low-refractive-index layer is excessively small, a slip is caused by a roll in the production process, bringing about damages, whereas if the dynamic friction coefficient is excessively large, the resistance to damage itself is impaired. Also, a composition whose contact angle with water is excessively large is inferior in the resistance to damage, whereas the contact angle with water is too small, a fingerprint and the like tend to adhere, leading to easy stain (contamination).

As examples of the crosslinkable fluorine-containing polymer compound constituting such a resin, in addition to perfluoroalkyl group-containing silane compounds (e.g., (heptadecafluoro-1,1,2,2-tetradecyl)triethoxysilane), fluorine-containing copolymers comprising a fluorine-containing monomer component and a monomer component for providing a crosslinkable group as the structural components are given.

Specific examples of the a fluorine-containing monomer unit include, for example, fluoroolefins (for example, fluoroethylene, vinylidene fluoride, tetrafluoroethylene, hexafluoroethylene, hexafluoropropylene, perfluoro-2,2-dimethyl-1,3-dioxol), partially or completely fluorinated alkyl ester derivatives of(meth)acrylic acid (for example, BISCOAT 6FM (trade name), manufactured by Osaka Organic Chemical Industry, Ltd., and M-2020 (trade name), manufactured by Daikin Industries, Ltd.), and completely or partially fluorinated vinyl ethers, or the like.

Given as examples of the monomer for giving crosslinkable group include, besides (meth)acrylate monomers having a crosslinkable functional group in advance in its molecule such as glycidyl methacrylate, (meth)acrylate monomers having a carboxyl group, hydroxyl group, amino group or sulfonic acid group (e.g., (meth)acrylic acid, methylol (meth)acrylate, hydroxyalkyl (meth)acrylate and allyl acrylate). It is known in JP-A-10-25388 and JP-A-10-147739 that the latter can introduce a crosslinked structure after it is copolymerized.

Also, not only the aforementioned polymer using a fluorine monomer as its structural unit but also a copolymer with a monomer containing no fluorine atom may be used. There is no particular limitation to the monomer unit, which may be used in combination, and the examples thereof include olefins (for example, ethylene, propylene, isoprene, vinyl chloride, and vinylidene chloride), acrylic acid esters (for example, methyl acrylate, ethyl acrylate, 2-ethylhexyl acrylate), methacrylic acid esters (for example, methyl methacrylate, ethyl methacrylate, butyl methacrylate, and ethyleneglycol dimethacrylate), styrenes and derivatives thereof (for example, styrene, divinylbenzene, vinyltoluene, and α-methylstyrene), vinyl ethers (for example, methyl vinyl ether), vinyl esters (for example, vinyl acetate, vinyl propionate, and vinyl cinnamate), acrylamides (for example, N-tert-butylacrylamide, N-cyclohexylacrylamide), methacrylamides and acrylonitrile derivatives.

As the inorganic fine particle used in the low-refractive-index layer, amorphous materials are preferably used. Those comprising an oxide, nitride, sulfide or halide of a metal are preferred with metal oxides being particularly preferable. As the metal atom, Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb and Ni are preferable, and Mg, Ca, B and Si are more preferable. An inorganic compound containing two types of metal may be used. A particularly preferable inorganic compound is silicon dioxide, namely silica.

The average particle diameter of the inorganic fine particles is preferably 0.001 to 0.2 μm and more preferably 0.005 to 0.05 μm. Preferably the particle diameter of the fine particle is as uniform (monodispersion) as possible.

The amount of the inorganic fine particles to be added is preferably 5 to 90% by weight, more preferably 10 to 70% by weight, and particularly preferably 10 to 50% by weight, based on the total amount of the low-refractive-index layer.

Preferably the inorganic fine particles are subjected to surface treatment before use. Examples of the surface treatment include physical surface treatments, such as plasma discharge treatment and corona discharge treatment, and chemical surface treatments using a coupling agent. The use of a coupling agent is preferred. As the coupling agent, an organoalkoxy metal compound (e.g., a titanium coupling agent and silane coupling agent) are preferably used. When the inorganic fine particle is silica, silane coupling treatment is particularly effective.

The respective layers of the anti-reflection film can be formed by application, according to any one of dip coat, air knife coat, curtain coat, roller coat, wire bar coat, gravure coat, and extrusion coat (as described in U.S. Pat. No. 2,681,294) methods. Two or more layers may be applied at the same time. The method for application of two or more layers at the same time is described, for example, in U.S. Pat. Nos. 2,761,791, 2,941,898, 3,508,947, and 3,526,528, and in p. 253 of "coating Kogaku (Coating Engineering)" written by Yuji Harasaki and published by Asakura Syoten (1973), each of which methods can be applied.

In the first and third embodiments of the anti-glare and anti-reflection film of the present invention, the thickness of the substrate quite differs depending upon its use. The thickness of the anti-glare layer is as aforementioned. The thickness of the low-refractive-index layer is preferably 0.08 to 0.15 μm and more preferably 0.09 to 0.12 μm, and the thickness of the hardcoat layer is preferably 1 to 10 μm and more preferably 3 to 6 μm.

In the second embodiments of the anti-glare and anti-reflection film of the present invention, there is no particular limitation on the thickness of each layer. The thickness of the transparent support is quite different depending upon its use. The thickness of the anti-glare hardcoat layer is as aforementioned. In the case of providing another hardcoat layer, the thickness of the hardcoat layer is preferably 2 to 10 μm and more preferably 3 to 6 µm. The thickness of the low-refractive-index layer is preferably 0.05 to 0.2 µm and more preferably 0.08 to 0.12 µm.

The anti-glare and anti-reflection film of the present invention (all of the first, second and third embodiments) may be structured by providing the aforementioned anti-glare layer and low-refractive-index layer in this order on the aforementioned substrate. As to the low-refractive-index layer, two or more low-refractive-index layers which each have a refractive index as defined in the present invention and different structural components may be provided. In the present invention, preferably the aforementioned hardcoat layer is further disposed between the substrate and the anti-glare layer and two or more hardcoat layers having different structural components may be disposed.

Also, as the second embodiment of the anti-glare and anti-reflection film of the present invention, one having a low-refractive-index layer on an anti-glare hardcoat layer can be taken. In this case, a further hardcoat layer can be provided under the anti-glare hardcoat layer.

In addition, in the third embodiment of the anti-glare and anti-reflection film of the present invention, a structure wherein an anti-glare layer is directly provided on a substrate (preferably a transparent support), and a low-refractive-index layer is further provided thereon as an over layer, can be taken.

The polarizing plate of the present invention comprises the aforementioned anti-glare and anti-reflection film as at least one of two protective films of the polarizing layer. By using the anti-glare and anti-reflection film of the present invention on the outermost surface, reflective imaging caused by the reflection of external light is prevented and a polarizing plate which is superior in resistance to damage and stainproofing capability can be obtained. Also, in the polarizing plate of the present invention, the anti-glare and anti-reflection film can be used as the protective film in addition to anti-glare and anti-reflection action, which decreases production costs.

Preferably the aforementioned anti-glare and anti-reflection film of the present invention is secured to at least one of the protective films of both sides of the polarizing plate by using an adhesive or the like.

The anti-glare and anti-reflection film of the present invention can be applied to image display devices, such as a liquid crystal display device (LCD), plasma display panel (PDP), electroluminescence display (ELD) and cathode ray tube display device (CRT). When the anti-reflection film has a transparent support, the side of the transparent support is stuck to the surface of the image display of the image display device.

Image display devices to which the anti-glare and anti-reflection film of the present invention may be applied include those described in JP-A-7-287102 (e.g., the paragraphs (0059) to (0061) and FIG. 14 and FIG. 15) and JP-A-7-333404 (e.g., the paragraphs (0078) to (0079) and FIG. 19 and FIG. 20).

Next, referring to the drawings, the following will describe basic structures of polarizing plates having optical compensation capacity and anti-reflection ability of the present invention, and basic structures of image display devices utilizing the polarizing plate.

Figure 4:
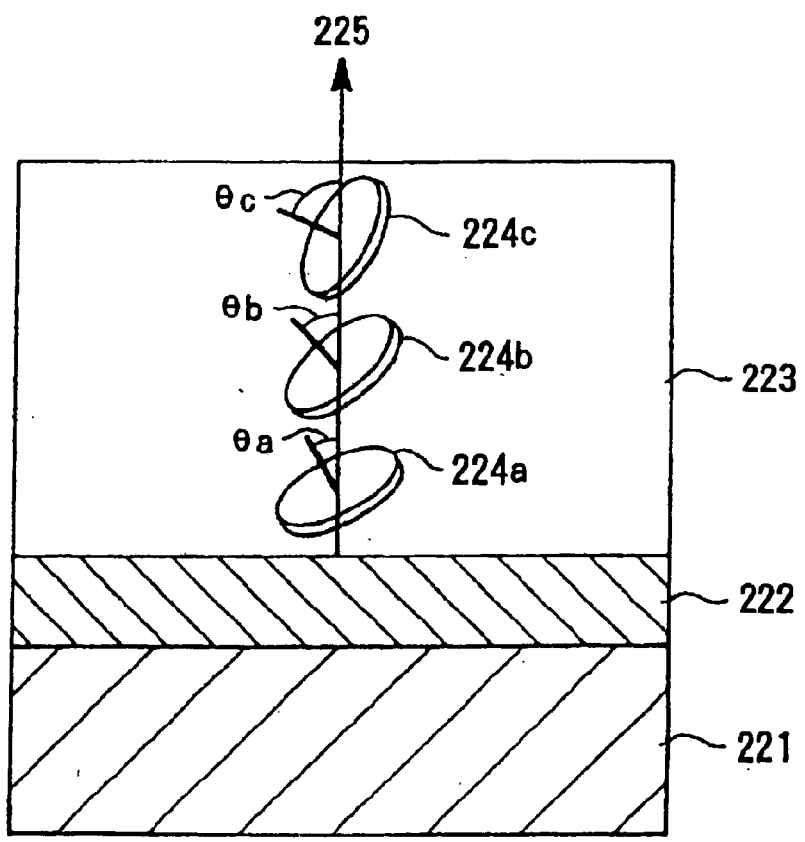
FIG. 4 is a sectional schematic view showing a representative layer constitution of an optical compensation film.

FIG. 4 is an example of a schematic cross-sectional view showing the layer construction of the optical compensative layer. The optical compensative layer has a layer construction of a transparent support 221, an alignment layer 222, and an optical anisotropic layer 223, in the written order. The optical anisotropic layer contains liquid crystalline discotic compounds 224a, 224b and 224c, and their light axes have inclined angles—which are defined as the angles of their light axes and a normal line of the transparent support 225—e.g. of θa, θb, θc, and the like, changing successively along the normal direction. These inclined angles are increased from the transparent support side of the optical anisotropic layer toward the surface side thereof.

Figure 5:
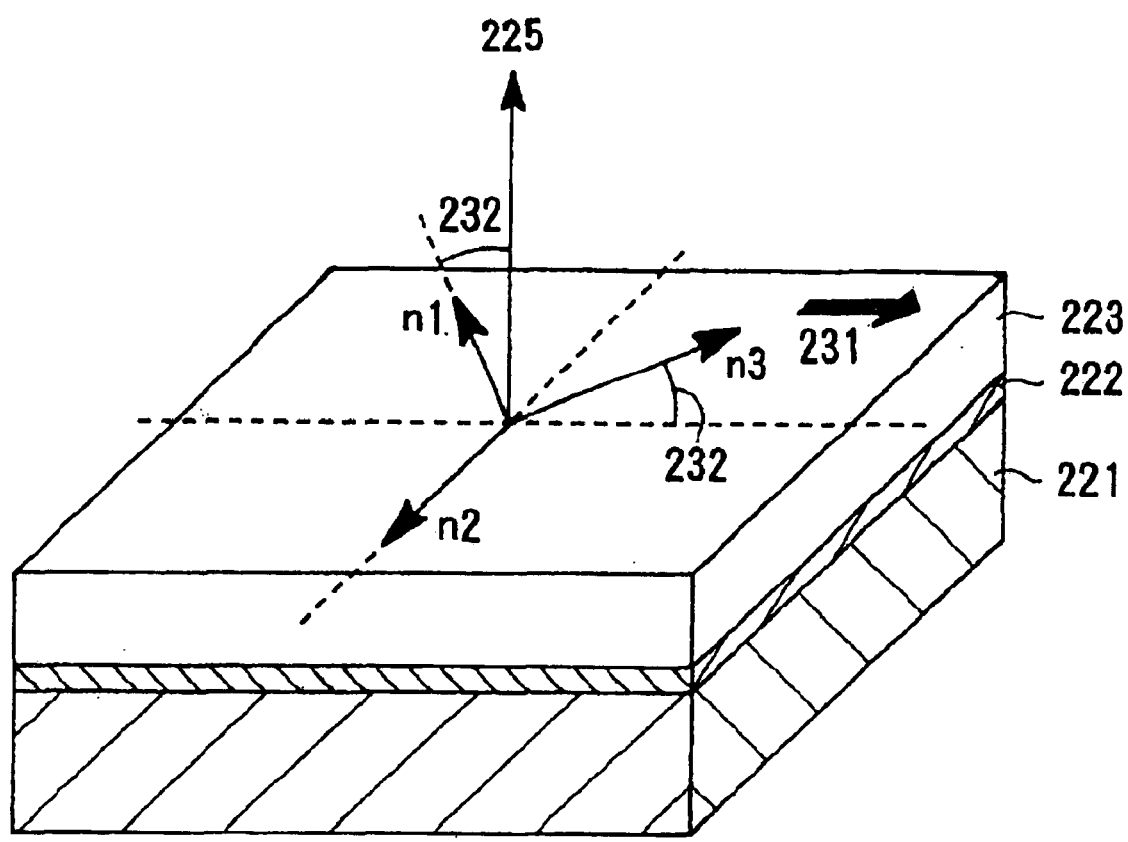
FIG. 5 is a diagram showing a representative constitution of an optical compensation film and a relationship between main refractive indices of three axes.

FIG. 5 shows optical characteristics of the optical compensative layer. The alignment layer is subjected to a treatment, such as rubbing, for alignment of the liquid crystalline discotic compound. The notation 231 shows a rubbing direction of the alignment layer. The notations n1, n2 and n3 stand for refractive indices of three orthogonal axes of the optical compensative layer. When it is viewed from the front, the axes satisfy a relation of $n1 \leq n3 \leq n2$. Herein, the phrase "when it is viewed from the front" means viewing a projection of FIG. 5 to a plane that is perpendicular to the normal line.

The optical compensative layer has a minimum value in the absolute value other than zero of retardation, in the direction inclined from a normal line direction of the transparent support. In the drawing, the notation 232 stands for an angle of the direction showing the minimum value in the absolute value of retardation with the normal line direction 225 of the transparent support. In order to improve viewing angle characteristics of TN-LCD, the angle 232 is preferably 5–50°, and especially preferably 10–40°.

The optical compensative layer satisfies the following equation:

$$20 \leq \{(nx+ny)/2 - nz\} \times d \leq 400$$

wherein nx, ny, and nz represent main refractive indices of three orthogonal axes of the optical compensation layer, nz represents a main refractive index in the direction of thickness of the transparent support, and d represents a thickness of the optical compensative layer (unit: nm).

Preferably the optical compensative layer satisfies the following equation:

$$50 \leq \{(nx+ny)/2 - nz\} \times d \leq 400$$

particularly preferably the optical compensative layer further satisfies the following equation:

$$100 < \{(nx+ny)/2 - nz\} \times d \leq 400$$

As a transparent support used in an optical compensation film, a plastic film is preferably used. Examples of the material of the plastic film include cellulose esters (for example, triacetylcellulose, diacetylcellulose, propionylcellulose, butyrylcellulose, acetylpropionylcellulose, and nitrocellulose), polyamides, polycarbonates, polyesters (for example, polyethylene terephthalate, polyethylene naphthalate, poly-1,4-cyclohexanedimethylene terephthalate, polyethylene-1,2-diphenoxyethane-4,4'-dicarboxylate, and polybutylene telephthalate), polystyrenes (for example, syndiotactic polystyrene), polyolefins (for example, polypropylene, polyethylene, and polymethylpentene), polysulfones, polyethersulfones, polyarylates, polyetherimides, polymethylmethacrylates, and polyetherketones; and ZEONEX (trade name, made by Nippon Zeon Co., Ltd.) and ARTON (trade name, made by JSR Co., Ltd.) as a commercial product.

The light transmittance of the transparent support is preferably 80% or more, and more preferably 86% or more. The transparent support preferably has optical isotropy when seen from its front. The haze of the transparent support is preferably 2.0% or less, and more preferably 1.0% or less. The refractive index of the transparent support is preferably 1.4 to 1.7(%).

From these viewpoints, preferable are triacetylcellulose, polycarbonate, and polyethylene terephthalate; ZEONEX and ARTON. For a protecting film for protecting a polarizing layer of the polarizing plate for an LCD, triacetylcellulose is especially preferable.

If a main refractive index inside the transparent support surface is nx and ny, while a main refractive index in the direction of thickness is nz, and the thickness is d, the relation of the main refractive indices is to satisfy nz<ny=nx (negative uniaxiality), and a retardation represented by {(nx+ny)/2−nz}×d is to be 20 to 400 nm. A retardation of the transparent support is more preferably 30 to 150 nm. It is not necessary that nx and ny are strictly equal, and no problem to apply in practice arises if |nx−ny|/|nx−nz|≦0.2. A front retardation represented by |nx−ny|×d is preferably 50 nm or less, and further preferably 20 nm or less.

An undercoat layer may be laminated on the transparent support in order to give the support adhesion properties to an adjacent layer. The raw material of such an undercoat layer is not especially limited, but may be, for example, gelatin, a poly(meth)acrylate resin, a substitution product thereof, or a styrene/butadiene resin, in case of the layer is formed on triacetylcellulose. Surface treatments, such as chemical treatment, mechanical treatment, corona treatment, or glow discharge treatment, may be performed.

The alignment layer functions to determine the alignment direction of a liquid crystalline discotic compound provided thereon. This alignment (orientation) gives a light axis inclined from the normal line direction of the transparent support. No limitation exists if the alignment layer is able to impart alignment to an optical anisotropic layer. Preferable examples of the alignment layer include, a layer formed by an organic compound and then subjected to rubbing treatment on its surface, an oblique vapor-deposition layer of an inorganic compound, a microgroove layer formed by patterning by a resist or the like, a Langmuir-Blodgett membrane of ω-tricosanoic acid, dioctadecyl-methylammonium chloride and methyl stearate, and a dielectric layer aligned by electric field or magnetic field.

A layer subjected to a rubbing treatment is preferable, as it is simple and inexpensive in production.

Illustrative of organic compounds for the alignment layer include polymers, such as polymethyl methacrylate, acrylic acid/methacrylic acid copolymers, styrene/maleimide copolymers, polyvinyl alcohol, poly(N-methylolacrylamide), styrene/vinyltoluene copolymers, chlorosulfonated polyethylenes, nitrocellulose, polyvinyl chloride, chlorinated polyolefins, polyesters, polyimides, vinyl acetate/vinyl chloride copolymers, ethylene/vinyl acetate copolymers, carboxymethylcellulose, polyethylenes, polypropylenes, and polycarbonates; and compounds including silane-coupling agents. Among these, polyimides, polystyrene, polyvinyl alcohol and alkyl-modified polyvinyl alcohol having an alkyl group (preferably, the group has at least 6 carbon atoms). Alkyl(preferably having at least 6 carbon atoms)-containing alkyl-modified polyvinyl alcohol is especially preferable. As polyimide, can be mentioned polyamic acid (for example, LQ/LX series (trade name, manufactured by Hitachi Chemical Co., Ltd.) and SE series (trade name, manufactured by Nissan Chemical Industries, ltd.), etc.) coated and baked at 100 to 300° C. for 0.5 to 1 hour. As the alkyl-modified polyvinyl alcohol, can be mentioned MP103, MP203, and R1130 (trade names, each manufactured by Kuraray Co.).

A treatment widely adopted for a liquid crystal alignment treatment step of LCD, can be utilized as the above rubbing treatment. More precisely, a method wherein the surface of an alignment layer is rubbed with paper, gauze, felt, rubber, polyamide (nylon), polyester-fibers, or the like, in a given direction can be utilized, to attain alignment. In general, a rubbing treatment is carried out several times with a cloth evenly embedded with fibers having uniform length and diameter.

Further, the optical anisotropic layer may be aligned without using an alignment layer. For this, a method can be mentioned wherein a liquid crystalline discotic compound layer forming the optical anisotropic layer is aligned by subjecting it to the influence of electric field, magnetic field, polarizing radiation or oblique non-polarizing radiation, etc.

An optical anisotropic layer is a layer having a negative birefringence, and comprised of a compound containing discotic structure units. The optical anisotropic layer is a layer of a liquid crystalline discotic compound or a polymer layer obtained by curing of a polymerizable discotic compound. Illustrative of the discotic compound for use in the present invention include benzene derivatives disclosed in a study report of C. Destrade et al., Mol. Cryst., 71, page 111 (1981); truxene derivatives disclosed in Mol. Cryst., 122, page 141 (1985), and Phyics. Lett., A, 78, page 82 (1990); cyclohexane derivatives disclosed in a study report of B. Kohne et al., Angew. Chem. Soc., 96, page 70 (1984); macrocycles of azacrown series and phenylacetylene series as disclosed in a study report of J. M. Lehn et al., J. Chem. Commun. Page 1794 (1985), and a study report of J. Zhang et al., J. Am. Chem. Soc. 116, page 2655 (1994). The aforesaid discotic (disc-like) compound generally is crystalline and has a structure wherein these compounds are existent in the center of the molecule as mother nucleus and a linear alkyl or alkoxyl groups and substituted benzoyloxy group, etc. are substituted radially as side chains. In general, compounds called discotic liquid crystals are included in this compound. However, the discotic compound for use in the present invention is not limited to the above description if the compound per se has a negative uniaxial property and is capable of imparting a definite alignment. Further, in the present invention, the phrase "formed from the discotic compound" referred to herein means that the final product is not necessarily the discotic compound and, for example, those obtained from a low molecular discotic liquid crystal, which has a functional group capable of crosslinking by heat or irradiation of ionizing radiation and is converted into a higher molecular compound to lose liquid crystalline property by heat or irradiation of ionizing radiation, is also included.

Preferable examples of the discotic compound are shown below, but the present invention is not limited to these.

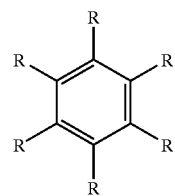

TE-1

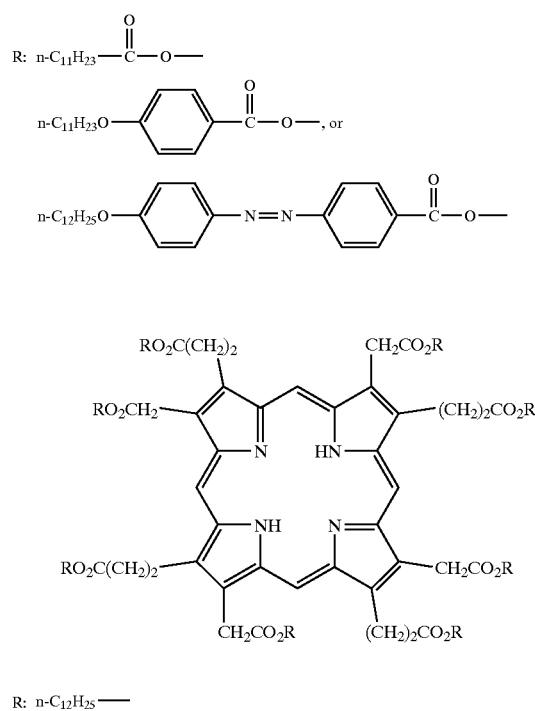
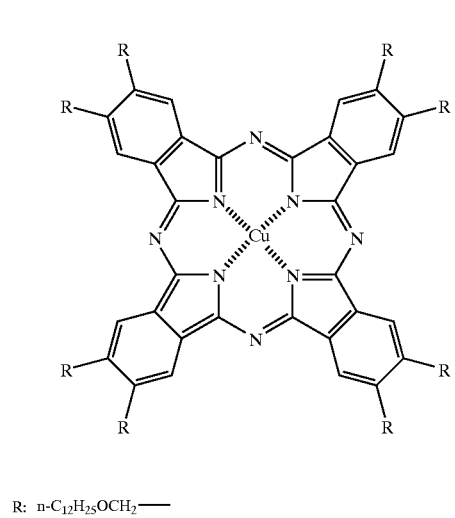
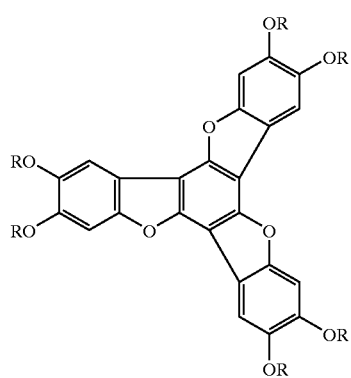
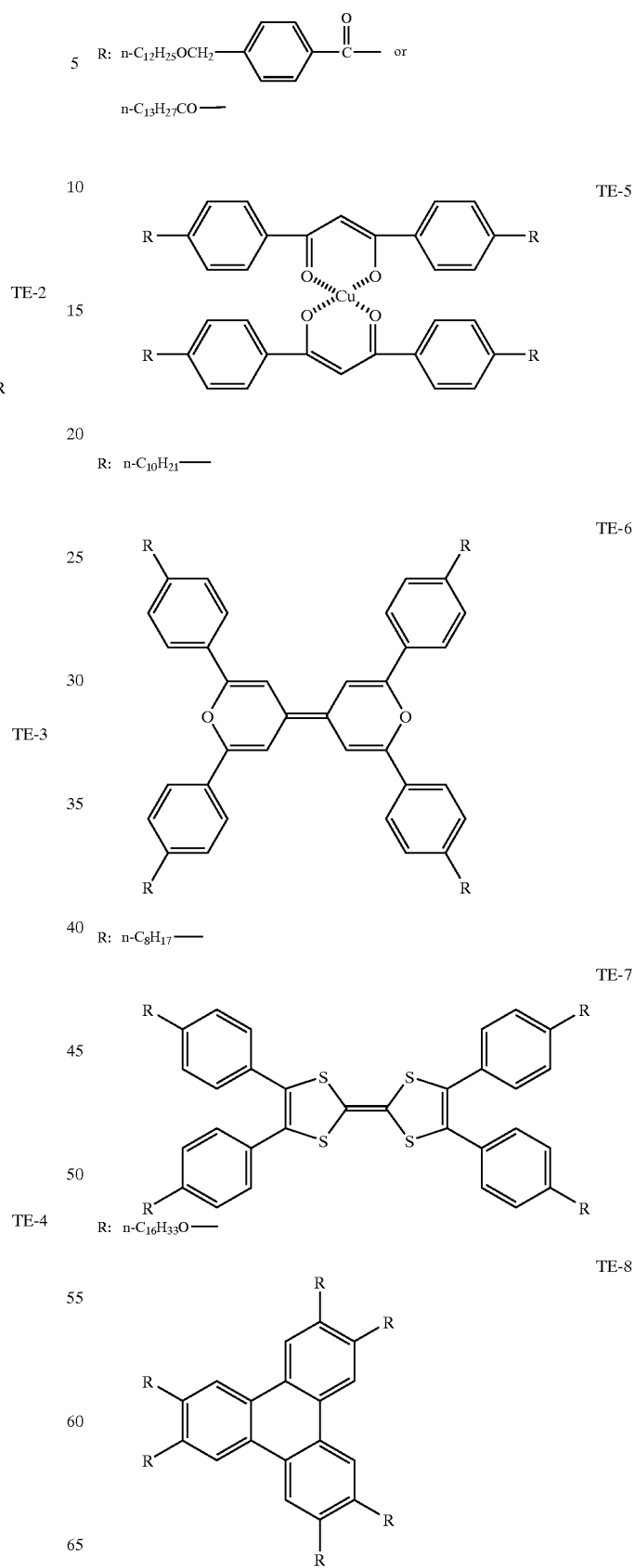

-continued

R: (1) n-C$_m$H$_{2m+1}$O— (m is an integral number of 2 to 15).

(2) n-C$_8$H$_{17}$—C(=O)—O—, (3) 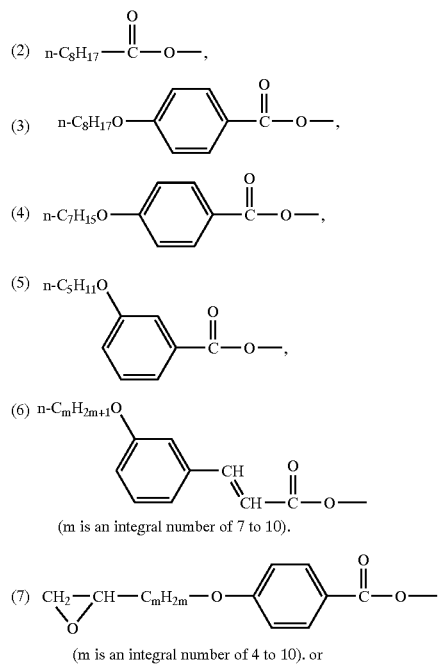

(4)

(5)

(6) n-C$_m$H$_{2m+1}$O (m is an integral number of 7 to 10).

(7) 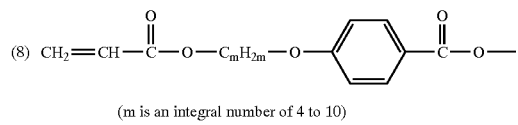

(m is an integral number of 4 to 10). or (8) CH$_2$=CH—C(=O)—O—C$_m$H$_{2m}$—O—

(m is an integral number of 4 to 10)

TE-9

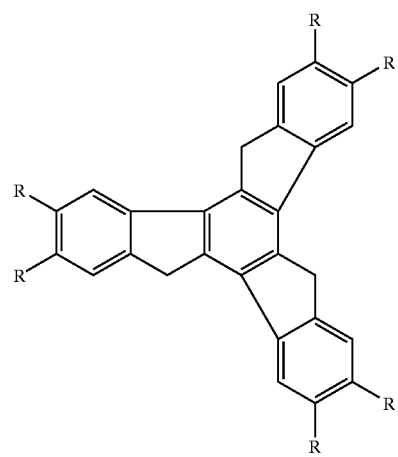

R: (1) n-C$_{10}$H$_{21}$C(=O)—O—, (2) n-C$_{16}$H$_{33}$O—

(3) CH$_3$O— 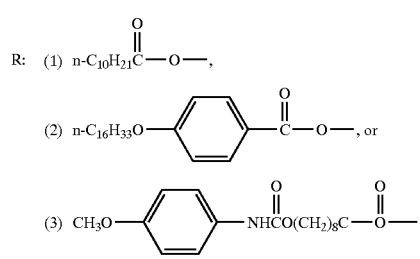

TE-10

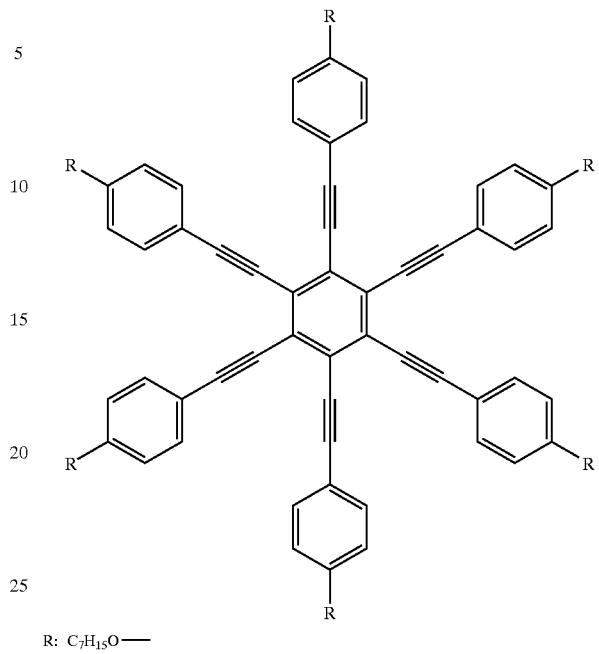

R: C$_7$H$_{15}$O—

TE-11

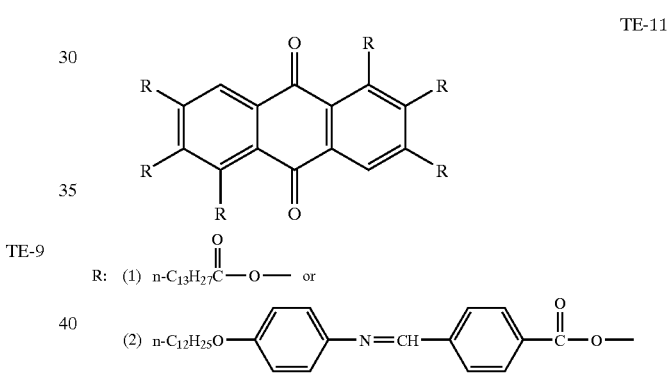

R: (1) n-C$_{13}$H$_{27}$C(=O)—O— or (2) n-C$_{12}$H$_{25}$O—

The optical anisotropic layer can be obtained by applying a coating solution dissolving the discotic compound and other compounds onto an alignment layer, drying the coated alignment layer, heating the layer up to a discotic nematic phase-forming temperature, and cooling the coated layer while holding the alignment state. Alternatively, the coated alignment layer may be heated up to a discotic nematic phase-forming temperature, and thereafter the discotic compound is polymerized and fixed by irradiation of ionizing radiation. A temperature for the discotic nematic liquid crystal phase-solid phase transition is preferably 50 to 300° C., and especially preferably 70 to 170° C.

The optical anisotropic layer may be incorporated with any of the compounds such as a plasticizer, a surfactant, a polymerizable monomer, a high molecular compound, etc. for controlling the inclined angle of the liquid crystalline discotic compound, a discotic nematic phase-forming temperature, compatibility, coating property, etc. so far as the alignment of the discotic compound is not disturbed.

A polymerizable monomer preferably has a vinyl group, a vinyloxy group, an acryloyl group, and a methacryloyl group. The polymerizable monomer can be used in an amount of generally 1 to 50% by weight, preferably 5 to 30% by weight, to the discotic compound.

Any of the high molecular compounds can be used so far as they possess compatibility with the discotic compound. The high molecular compound is preferably cellulose esters. Above all, cellulose acetate butyrate is especially preferable. The high molecular compound can be used in an amount of generally 0.1–10% by weight, preferably 0.1–5% by weight, based on the discotic compound. Further, a butyrating degree of the cellulose acetate butyrate is preferably 30–80%, while an acetylating degree thereof is preferably 30–80%.

Next, the anti-reflection layer (that comprises a transparent support, an anti-glare layer, and a low-refractive-index layer), which is preferably used in the polarizing plate and the liquid crystal display device utilizing the polarizing plate of the present invention, is explained. As to the anti-reflection layer, any of the above-mentioned anti-glare and anti-reflection films of the present invention (the first, second and third embodiments) can be preferably used.

As an example of a layer structure of the anti-reflection layer, the anti-glare and anti-reflection film, whose schematic cross-sectional view is shown in FIG. 2, can be mentioned. The anti-reflection layer has a layer structure in which a transparent support 101, an anti-glare layer 102 and a low-refractive-index layer 103 are arranged in this order. The anti-glare layer contains a particle 104 to impart anti-glare capability. This particle forms irregularity on the surface (surface roughness), to give anti-glare capability. For the low-refractive-index layer; a fluorine-containing compound which crosslinks by heat or ionizing radiation is used. Preferably the refractive index and the film thickness of the low-refractive-index layer fulfills the above mentioned equation (I).

It is preferable to use a plastic film as a transparent support in the anti-reflecting layer. Illustrative of materials for the plastic film include cellulose esters (for example, triacetyl cellulose, diacetyl cellulose, propionyl cellulose, butyryl cellulose, acetyl propionyl cellulose, and nitrocellulose), polyamides, polycarbonates, polyesters (for example, polyethylene terephthalate, polyethylene naphthalate, poly-1,4-cyclohexanedimethylene terephthalate, polyethylene-1,2-diphenoxyethane-4,4'-dicarboxylate or polybutylene terephthalate), polystyrenes (for example, syndiotactic polystyrene), polyolefins (for example, polypropylene, polyethylene or polymethylpentene), polysulfones, polyethersulfones, polyallylates, polyetherimides, polymethyl methacrylates, and polyether ketones, as well as Zeonex (trade name, manufactured by Nippon Zeon Co.) and ARTON (trade name, manufactured by JSR KK) as commercially available products.

The transparent support preferably has a light transmittance of 80% or more, more preferably 86% or more. The transparent support preferably has optical isotropy when seen from its front. Haze of the transparent support is preferably 2.0% or less, more preferably 1.0% or less. A refractive index of the transparent support is preferably 1.4 to 1.7.

Viewing from these points, preferable are triacetyl cellulose, polycarbonate, polyethylene terephthalate, Zeonex and ARTON. As a protective membrane for protecting a polarizing layer of a polarizing plate for use in LCD, triacetyl cellulose is especially preferable.

A sub-layer (undercoat layer) may be provided on the transparent support for imparting tight adherence to adjacent layers. No particular limitation exists in materials for forming such sub-layer. On triacetyl cellulose, for example, gelatin, poly(meth)acrylate resins or a substitute thereof, styrene/butadiene resin, etc. can be used. In addition, a surface treatment such as a chemical treatment, mechanical treatment, corona treatment, glow discharge treatment, etc. may be carried out.

No particular limitation is imposed on the binder to be used in the anti-glare layer insofar as it has a refractive index of 1.57 to 2.00. Preferably the binder has hard-coatability so that it becomes resistant itself to damages during processing.

A high-refractive-index monomer having a refractive index of 1.57 or more and preferably 1.65 or more may be used to make the refractive index of the binder of the anti-glare layer higher. Examples of the high-refractive-index monomer include bis(4-methacryloylthiophenyl) sulfide, vinylnaphthalene, vinylphenylsulfide, 4-methacryloxyphenyl-4'-methoxyphenyl thioether.

In the anti-glare layer, light-scatterable particles may be used to prevent the deterioration of reflectance and uneven color caused by the provision of anti-glare capability and the interference of a hardcoat layer. The light-scatterable particles have an average particle diameter of generally 0.01 to 1.0 $\mu$m, and a refractive index of 1.35 to 1.65 or 2.00 to 3.00 which differs from the refractive index of the binder by 0.03 or more.

The addition of the light-scatterable particles causes internal scattering in the anti-glare layer, resulting in the formation of a refractive index-ununiform layer, which means that the refractive index of the whole anti-glare layer is not defined as one value.

Examples used to impart anti-glare capability to the anti-glare layer include those obtained by applying an uneven layer, produced by adding particles to a binder, onto a transparent support, as described in JP-A-61-209154; those obtained by transferring unevenness, by applying or adhering a film formed with an uneven surface in advance, onto a coating layer formed on a transparent support, as described in JP-A-6-16851; or those formed with unevenness by embossing-processing on a transparent support directly or thorough other layer such as a hardcoat layer.

Among these methods, the method of forming unevenness by adding particles to a binder is preferable, in the point that it ensures simple and stable production.

There is no particular limitation to the particle giving anti-glare capability insofar as it forms unevenness on the surface of the anti-glare layer. The difference in refractive index between the particle and the binder is preferably less than 0.05 and more preferably less than 0.02, to control internal scattering.

The average particle diameter is preferably 1 to 10 $\mu$m and more preferably 1.5 to 6 $\mu$m, to form unevenness efficiently on the surface of the anti-glare layer.

Given as examples of the particle include a poly(methyl methacrylate) resin, fluororesin, vinylidene fluoride resin, silicon resin, epoxy resin, polyamide(nylon) resin, polystyrene resin, phenol resin, polyurethane resin, crosslinkable acrylic resin, crosslinkable polystyrene resin, melamine resin and benzoguanamine resin. The particle is preferably those which are insoluble in water and organic solvents.

The particles to be added to the anti-glare layer may be a combination of two or more types of particle, to control unevenness.

As the compound for use in the low-refractive-index layer, a fluorine-containing compound having a refractive index of 1.38 to 1.49 is preferable, and a fluorine-containing compound that has a dynamic friction coefficient of 0.03 to 0.15 a contact angle of 90 to 120 degrees with water and is crosslinked by heat or ionic radiation, is more preferable, in view of stainprooifng capability and resistance to damage. Other compounds may be combined to regulate the applicability and the hardness of a resultant film. As examples of the crosslinkable fluorine-containing compound, fluorine-containing monomers and crosslinkable fluorine-containing polymers may be given, and the crosslinkable fluorine-containing polymers are preferable in view of applicability.

As a binder (a binder polymer and a monomer that provide the binder, etc.) utilized in the anti-glare layer in the anti-reflective layer, inorganic fine particles utilized to provide higher refractive index of the anti-glare layer, a fluorine-containing compound (a fluorine-containing polymer and a monomer to give the polymer, etc.) utilized in the low-refractive-index layer, those components as described in the corresponding section for the anti-glare and anti-reflection film of the present invention (the first to third embodiments) can be preferably used.

Similar to the anti-reflection layer, each layer of the optical compensative layer (film) can be formed by applying the materials according to the dip coating method, the air-knife coating method, the curtain coating method, the roller coating method, the wire bar coating method, the gravure coating method, and the extrusion coating method (U.S. Pat. No. 2,681,294). Two or more layers may be coated at the same time. A method for coating layers at the same time is disclosed in U.S. Pat. Nos. 2,761,791, 2,941,898, 3,508,947, and 3,526,528, and "Kotingu Kogaku (Coating Technology)" written by Yuji Harazaki, p. 253, published by Asakura Shoten (1973).

Figure 6:
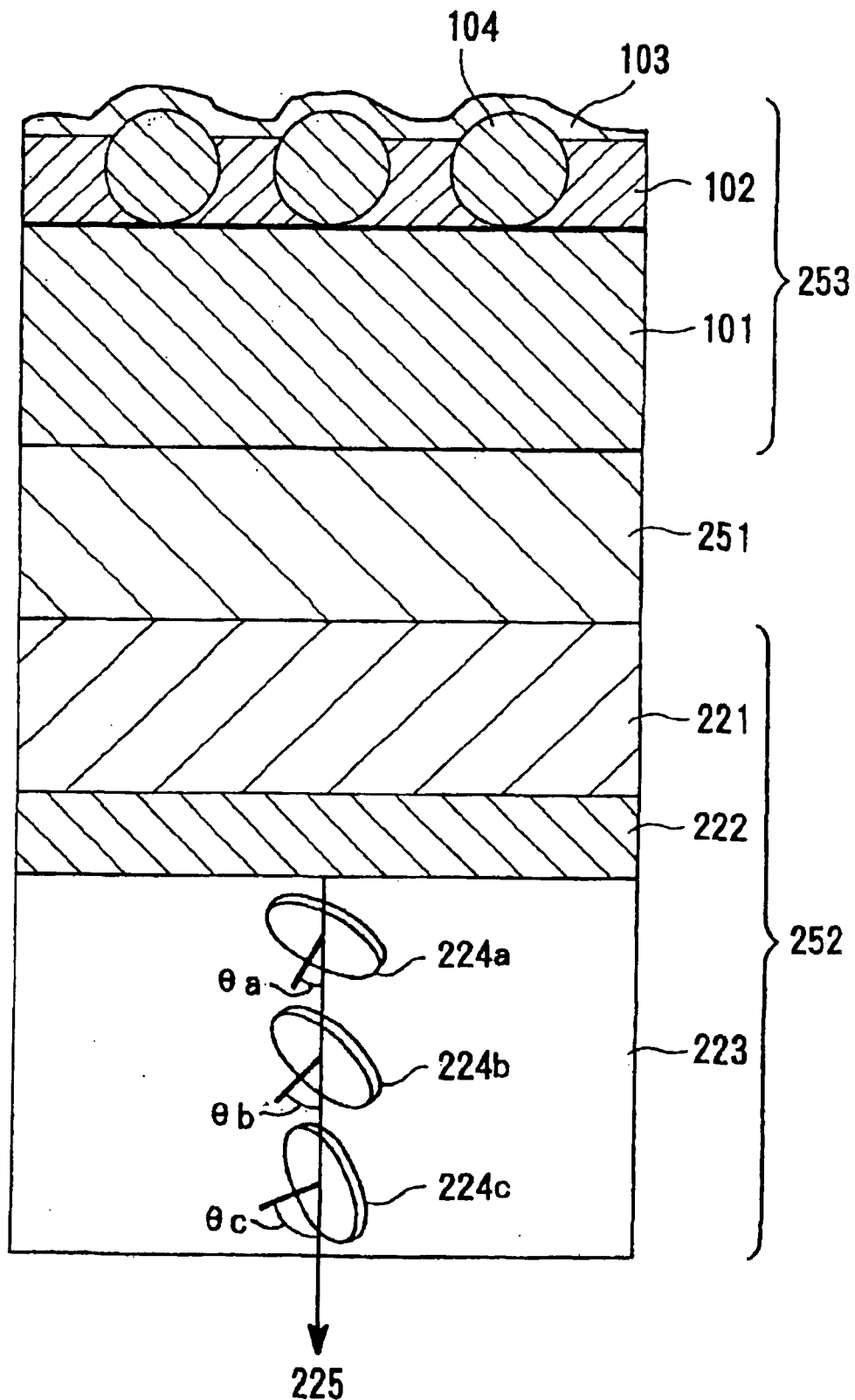
FIG. 6 is a sectional schematic view showing a representative layer constitution of a polarizing plate having optical compensation capability and anti-reflection ability.

FIG. 6 shows an example of the construction drawings of the polarizing plate having anti-reflection capacity as well as optical compensative capacity, of the present invention. The polarizing plate of the present invention comprises two transparent supports 221 and 101, a polarizing layer 251 interposed between the supports, an optical compensative layer 252 containing an optical anisotropic layer 223 on the surface opposite to the polarizing layer of one of the transparent supports, and an anti-reflection layer 253 on the surface opposite to the polarizing layer of the other transparent support.

Figure 7:
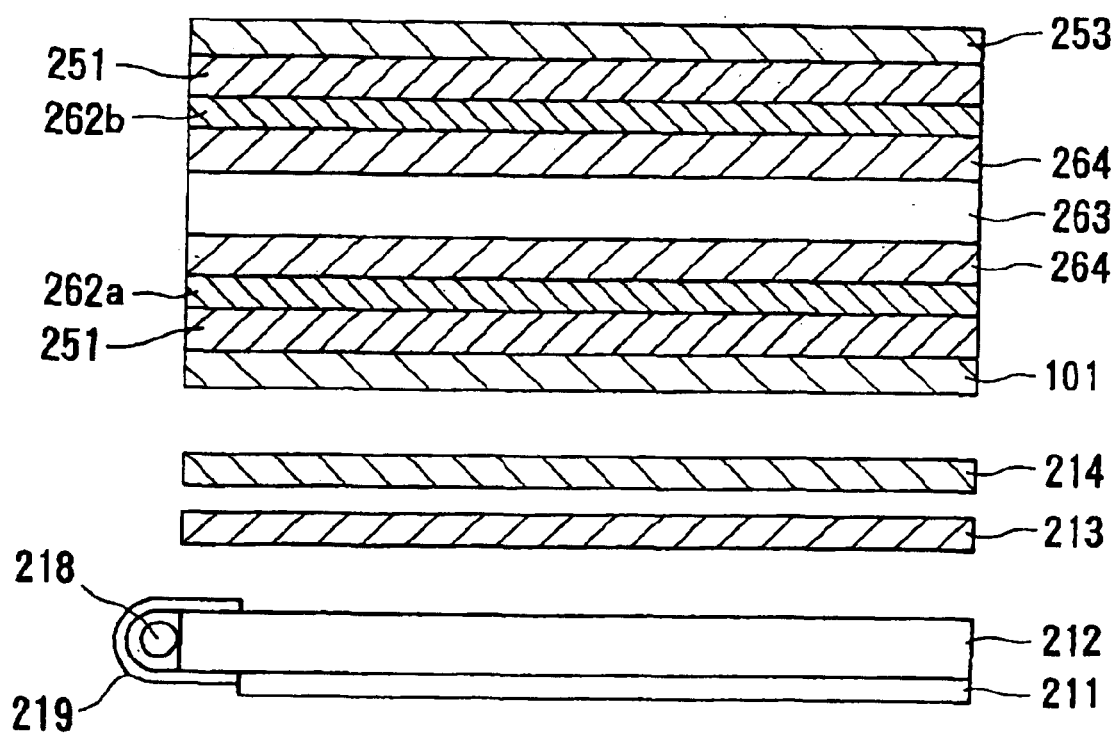
FIG. 7 is a drawing showing a representative construction of the liquid crystal display device employing the polarizing plate of the present invention.

The polarizing plate of the present invention, which has optical compensative capacity and anti-reflection capacity, can be applied to a liquid crystal display device. FIG. 7 shows an example of the construction drawings of such a liquid-crystal-display-type image display device. The anti-reflection layer 253 is disposed, as a polarizing plate on the side of a display in such manner that the anti-reflection layer is faced to the side of the display, while the optical compensative layer (film) 262b is stuck to a liquid crystal cell 263 by the aid of a adhesive layer 264 or the like. This polarizing plate having the optical compensative layer is also used as a polarizing plate on the side of backlight, while the optical compensative layer (film) 262a is stuck to the liquid crystal cell by the aid of a adhesive or the like.

Figure 8:
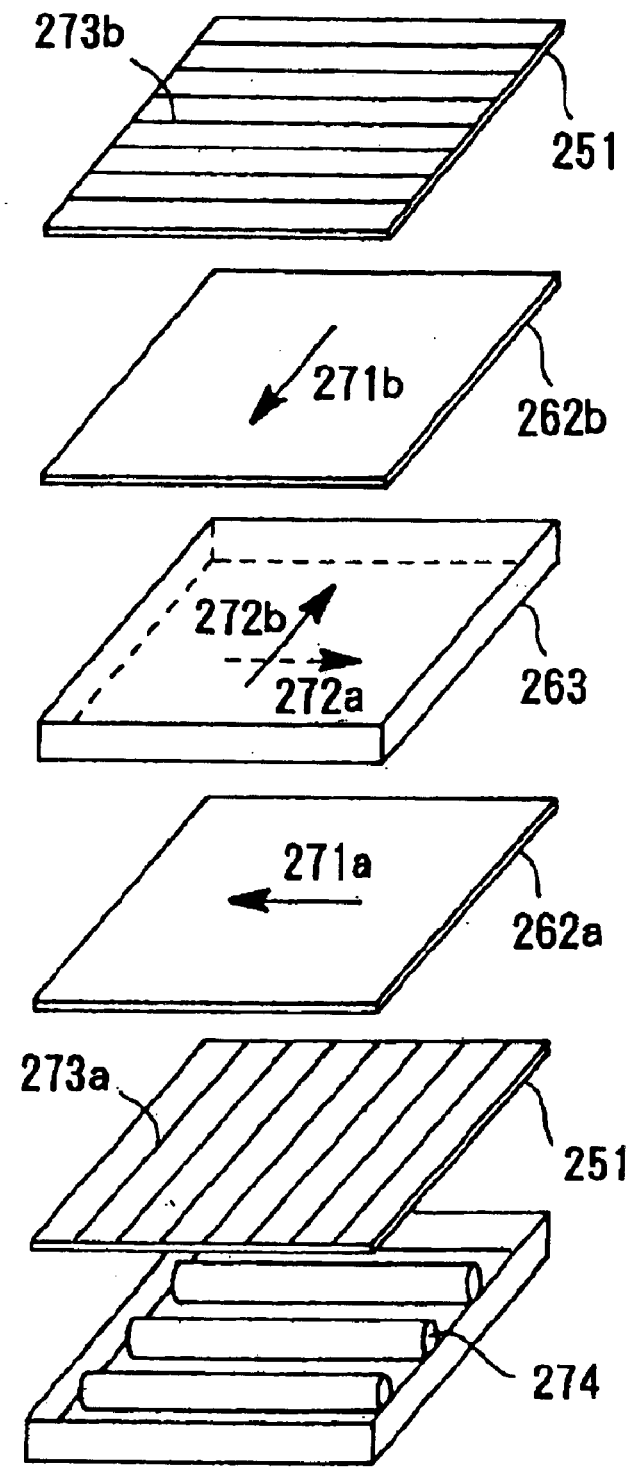
FIG. 8 is a drawing showing a representative structure of the liquid crystal display device of the present invention.

FIG. 8 is a representative schematic layout of the polarizing plate of the present invention for carrying out optical compensation. A backlight 274 side is a lower side, and a rubbing direction of a lower optical compensative layer 262a is 271a, while a rubbing direction of an upper optical compensative layer 262b is 271b. A broken-line arrow mark 272a of a liquid crystal cell 263 shows a rubbing direction of a liquid crystal cell substrate on the side of the backlight, while a solid line 272b shows a rubbing direction of the liquid crystal cell substrate on the side of the display. The notations 273a and 273b respectively show axes of transmittance (the directions of transmittance) of the polarizing plate (251).

As a schematic layout other than FIG. 8, the optical compensative layer may not be provided in the form divided into two polarizing plates of upper one and under one, as described above. In other words, two optical anisotropic layers may be provided on the side of the liquid crystal cell of the lower polarizing plate.

Figure 9:
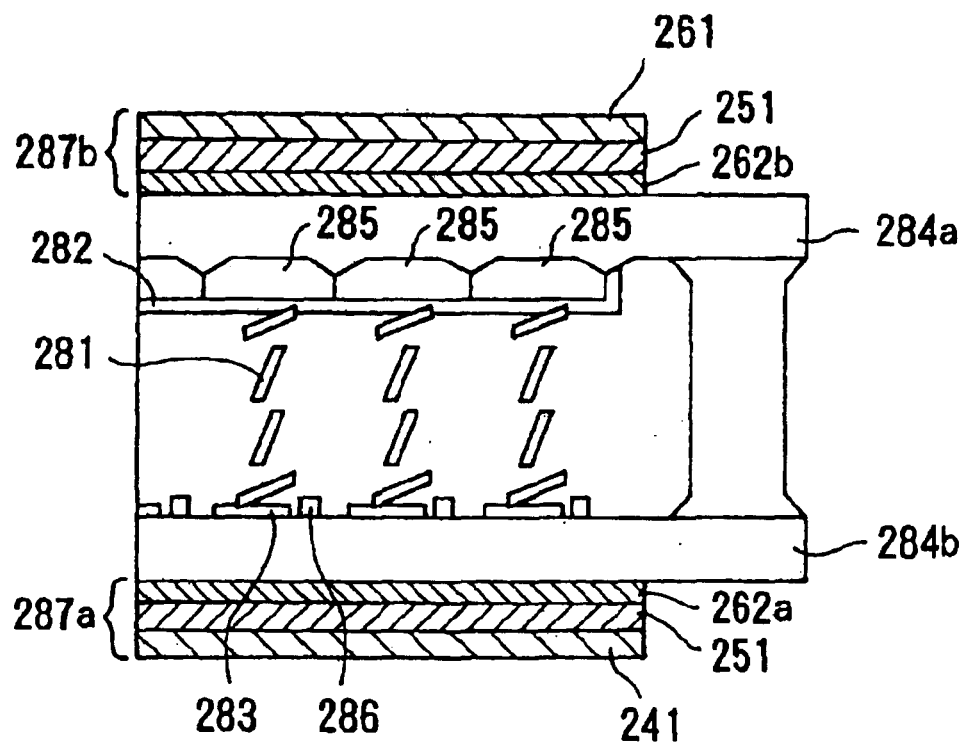
FIG. 9 is a drawing showing a representative structure of the color liquid crystal display device of the present invention.

FIG. 9 shows a representative construction drawing of a color-liquid-crystal-display-type image display device of the present invention. In FIG. 9, the color-liquid-crystal-display-type image display device is constructed by a liquid crystal cell comprising a glass substrate 284a provided with a facing transparent electrode 282 and a color filter 285, a glass substrate 284b provided with pixel electrodes 283 and TFT 286, and twisted nematic liquid crystals (twisted nematic liquid crystalline molecules) 281 interposed between the two substrates, and a pair of polarizing plates 287a (a lower polarizing plate) and 287b (a upper polarizing plate) provided on both sides of the liquid crystal cell. Among these parts, the notation 287b may be the polarizing plate of the present invention, and the notation 287a may have an optical anisotropic layer as shown in the figure. Alternatively, the lower polarizing plate may be provided with two optical anisotropic layers as described above.

The anti-glare and anti-reflection film of the present invention has high anti-reflection capability, is superior in stain-proofing capability and resistance to damage, and can be produced at low costs by the formations of the anti-glare hardcoat layer and low-refractive-index layer. The polarizing plate and liquid crystal display device, using this anti-glare and anti-reflection film, has such an excellent characteristics that reflective imaging caused by the reflection of external light is sufficiently prevented and it is superior in stain-proofing capability and resistance to damage.

The anti-glare and anti-reflection film of the present invention exhibits such an excellent working effect that it can be produced simply at low costs, that it has sufficient anti-glare capability, anti-reflection capability, resistance to damage and stain-proofing capability, and that it is less in uneven color. Therefore, the polarizing plate using this anti-glare and anti-reflection film, and the liquid-crystal-display-type image display device using the anti-glare and anti-reflection film for the front surface of the display device, each exhibit such an excellent working effect that they are free from a reduction of contrast and reflective imaging caused by the reflection of external light, to have excellent visibility, and that they are also free from uneven color, as well as high in resistance to damage and stain-proofing capability of the display surface.

Further, according to the polarizing plate having optical compensation capacity and anti-reflection ability of the present invention, the liquid-crystal-display-type image display device using the polarizing plate, or the color-liquid-crystal-display-type image display device using the polarizing plate, it is possible to overcome deterioration in display quality due to reflection from light from the outside. Further, by enlarging the field angle of the liquid-crystal-display-type or color liquid-crystal-display-type image display device in a TN mode, it is possible to provide a liquid-crystal-display-type image display device having excellent display quality in all directions. Also, by using the method such as application enabling high mass-productivity, the polarizing plate and the liquid crystal display device of the present invention can be produced simply and stably, as well as the polarizing plate having optical compensation capacity and anti-reflection capability of the present invention can be supplied at a low cost.

In order to explain the present invention in more detail, the present invention will be described by way of working examples hereinafter, but the present invention is not limited to these examples.

EXAMPLES (Preparation of a Coating Solution A for Anti-Glare Layer)

125 g of a mixture of dipentaerythritol pentaacrylate and dipentaerythritol hexaacrylate (trade name: DPHA, manufactured by Nippon Kayaku Co., Ltd.) and 125 g of bis(4-methacryloylthiophenyl)sulfide (trade name: MPSMA, manufactured by Sumitomo Seika chemicals co., Ltd.) were dissolved in 439 g of a mixed solvent of methyl ethyl ketone/cyclohexanone (50/50% by weight). To the resulting solution was added a solution obtained by dissolving 5.0 g of a photopolymerization initiator (trade name: Irgacure 907, manufacture by Ciba Geigy Co.) and 3.0 g of a photosensitizer (trade name: KAYACURE DETX, manufactured by Nippon Kayaku Co., Ltd.) in 49 g of methyl ethyl ketone. The coating film obtained by applying this solution, and then curing the applied solution using ultraviolet rays, had a refractive index of 1.60.

10 g of crosslinkable polystyrene particles (trade name: SX-200H, manufactured by Soken Chemical & Engineering Co., Ltd.) having an average particle diameter of 2 μm was further added to this solution, and the mixture was stirred for one hour using a high speed disperser at 5000 rpm to disperse, followed by filtration using a polypropylene filter having a pore diameter of 30 μm to prepare a coating solution A for an anti-glare layer.

(Preparation of a Coating Solution B for Anti-Glare Layer)

217.0 g of a hardcoat coating solution containing a dispersion of zirconium oxide (particle diameter: about 30 nm) (trade name: KZ-7886A, manufactured by JSR Corporation) was added to a mixed solvent of 104.1 g of cyclohexanone and 61.3 g of methyl ethyl ketone, while stirring using an air disperser. The coating film obtained by applying this solution, and then by curing the applied solution using ultraviolet rays, had a refractive index of 1.61.

5 g of crosslinkable polystyrene particles (trade name: SX-200H, manufactured by Soken Chemical & Engineering Co., Ltd.) having an average particle diameter of 2 μm was added to this solution, and the mixture was stirred for one hour using a high speed disperser at 5000 rpm to disperse, followed by filtration using a polypropylene filter having a pore diameter of 30 μm to prepare a coating solution B for an anti-glare layer.

(Preparation of a Coating Solution C for Anti-Glare Layer)

217.0 g of a hardcoat coating solution containing a dispersion of zirconium oxide (particle diameter: about 30 nm) (trade name: KZ-7991, manufactured by JSR Corporation) was added to a mixed solvent of 104.1 g of cyclohexanone and 61.3 g of methyl ethyl ketone, while stirring using an air disperser. The coating film obtained by applying this solution, and then curing the applied solution using ultraviolet rays, had a refractive index of 1.70.

5 g of crosslinkable polystyrene particles (trade name: SX-200H, manufactured by Soken Chemical & Engineering Co., Ltd.) having an average particle diameter of 2 μm was further added to this solution, and the mixture was stirred for one hour using a high speed disperser at 5000 rpm to disperse, followed by filtration using a polypropylene filter having a pore diameter of 30 μm to prepare a coating solution C for an anti-glare layer.

(Preparation of a Coating Solution A for a Hard Coat layer)

250 g of a mixture of dipentaerythritol pentaacrylate and dipentaerythritol hexaacrylate (DPHA (trade name), made by Nippon Kayaku Co., Ltd.) was dissolved in 439 g of a mixture solvent of methyl ethyl ketone and cyclohexanone (50/50 by weight %). To the resultant solution was added a solution wherein 7.5 g of a photopolymerization initiator (Irgacure 907 (trade name), made by Chiba Geigy Co.) and 5.0 g of a photosensitizer (Kayacure DETX (trade name), made by Nippon Kayaku Co., Ltd.) were dissolved in 49 g of methyl ethyl ketone. When this solution was applied and hardened by ultraviolet rays to obtain a coating film, the refractive index thereof was 1.53.

This solution was further filtrated with a filter made of polypropylene and having pores of 30 μm in diameter, to prepare a coating solution A for a hard coat layer.

(Preparation of a Coating Solution A for Low-Refractive-Index Layer)

200 g of methyl isobutyl ketone was added to 200 g of a thermally crosslinkable fluorine-containing polymer (trade name: JN-7221, manufactured by JSR Corporation) having a refractive index of 1.46. The mixture was stirred, and then subjected to filtration using a polypropylene filter having a pore diameter of 1 μm, to prepare a coating solution A for a low-refractive-index layer.

(Preparation of a Coating Solution D for Anti-Glare Hard-coat Layer)

250 g of a mixture of dipentaerythritol pentaacrylate and dipentaerythritol hexaacrylate (trade name: DPHA, manufactured by Nippon Kayaku Co., Ltd.) was dissolved in 439 g of a mixed solvent of methyl ethyl ketone/cyclohexanone (50/50% by weight). To the resulting solution was added a solution obtained by dissolving 7.5 g of a photopolymerization initiator (trade name: Irgacure 907, manufacture by Ciba Geigy Co.) and 5.0 g of a photosensitizer (trade name: KAYACURE DETX, manufactured by Nippon Kayaku Co., Ltd.) in 49 g of methyl ethyl ketone. The coating obtained by applying this solution, and then curing the applied solution using ultraviolet rays, had a refractive index of 1.53.

10 g of amorphous silica particles (trade name: Mizukasil P-526, manufactured by Mizusawa Industrial Chemicals, Ltd.) having an average particle diameter of 3 μm was further added to this solution, and the mixture was stirred for one hour using a high speed disperser at 5000 rpm to disperse, followed by filtration using a polypropylene filter having a pore diameter of 30 μm, to prepare a coating solution D for an anti-glare hardcoat layer.

(Preparation of a Coating Solution B for Low-Refractive-Index Layer)

15.2 g of a silica sol (trade name: MIBK-ST, average particle diameter: 10 to 20 nm, solid content concentration: 30% by weight, manufactured by Nissan Chemical Industries, Ltd.) and 174 g of methyl isobutyl ketone were added to 210 g of a thermally crosslinkable fluorine-containing polymer (trade name: JN-7223, solid content concentration: 6% by weight, manufactured by JSR Corporation) having a refractive index of 1.40. The mixture was stirred, and then subjected to filtration using a polypropylene filter having a pore diameter of 1 μm, to prepare a coating solution B for a low-refractive-index layer.

(Preparation of a Coating Solution C for Low-Refractive-Index Layer)

4.6 g of a magnesium fluoride particle having an average particle diameter of 0.1 μm and 185 g of methyl isobutyl ketone were added to 210 g of a thermally crosslinkable fluorine-containing polymer (JN-7223 (trade name), solid content concentration: 6% by weight, manufactured by JSR Corporation) having a refractive index of 1.40. The mixture was stirred, and then subjected to filtration using a polypropylene filter having a pore diameter of 5 μm, to prepare a coating solution C for a low-refractive-index layer.

(Preparation of a Coating Solution D for Low-Refractive-Index Layer)

120 g of methyl isobutyl ketone was added to 280 g of a thermally crosslinkable fluorine-containing polymer (JN-7223, solid content concentration: 6% by weight, manufactured by JSR Corporation) having a refractive index of 1.40. The mixture was stirred and then subjected to filtration using a polypropylene filter having a pore diameter of 1 μm, to prepare a coating solution D for a low-refractive-index layer.

(Preparation of a Coating Solution E for Low-Refractive-Index Layer)

4.6 g of a silica particle having an average particle diameter of 1.0 μm and 185 g of methyl isobutyl ketone were added to 210 g of a thermally crosslinkable fluorine-containing polymer (JN-7223, solid content concentration: 6% by weight, manufactured by JSR Corporation) having a refractive index of 1.40. The mixture was stirred and then subjected to filtration using a polypropylene filter having a pore diameter of 5 μm, to prepare a coating solution E for a low-refractive-index layer.

(Preparation of a Coating Solution F for Low-Refractive-Index Layer)

4.6 g of a polymethylmethacrylate crosslinkable particle having an average particle diameter of 0.1 μm and 185 g of methyl isobutyl ketone were added to 210 g of a thermally crosslinkable fluorine-containing polymer (JN-7223, solid content concentration: 6% by weight, manufactured by JSR Corporation) having a refractive index of 1.40. The mixture was stirred and then subjected to filtration using a polypropylene filter having a pore diameter of 1 μm, to prepare a coating solution F for a low-refractive-index layer.

(Preparation of a Coating Solution E for Anti-Glare Layer)

125 g of a mixture of dipentaerythritol pentaacrylate and dipentaerythritol hexaacrylate (trade name: DPHA, manufactured by Nippon Kayaku Co., Ltd.) and 125 g of bis(4-methacryloylthiophenyl)sulfide (trade name: MPSMA, manufactured by Sumitomo Seika Chemicals Co., Ltd.) were dissolved in 439 g of a mixed solvent of methyl ethyl ketone/cyclohexanone (50/50% by weight). To the resulted solution was added a solution obtained by dissolving 5.0 g of a photopolymerization initiator (trade name: Irgacure 907, manufacture by Ciba Geigy Co.) and 3.0 g of a photosensitizer (KAYACURE DETX, manufactured by Nippon Kayaku Co., Ltd.) in 49 g of methyl ethyl ketone. The coating film obtained by applying this solution and by curing the applied solution using ultraviolet rays, had a refractive index of 1.60.

10 g of crosslinkable polystyrene particles (trade name: SX-500H, manufactured by Soken Chemical & Engineering Co., Ltd.) having an average particle diameter of 5 μm was added to this solution and the mixture was stirred for one hour using a high speed disperser at 5000 rpm to disperse, followed by filtration using a polypropylene filter having a pore diameter of 30 μm, to prepare a coating solution E for an anti-glare layer.

(Preparation of a Coating Solution F for Anti-Glare Layer)

217.0 g of a hardcoat coating solution containing a dispersion of zirconium oxide (contained 38 weight % of zirconium oxide, trade name: KZ-7886A, manufactured by JSR Corporation) was added to a mixed solvent of 104.1 g of cyclohexanone and 61.3 g of methyl ethyl ketone, while stirring using an air disperser. The coating film obtained by applying this solution and by curing the applied solution using ultraviolet rays, had a refractive index of 1.61.

5 g of crosslinkable polystyrene particles (trade name: SX-500H, manufactured by Soken Chemical & Engineering Co., Ltd.) having an average particle diameter of 5 μm was further added to this solution, and the mixture was stirred for one hour using a high speed disperser at 5000 rpm to disperse, followed by filtration using a polypropylene filter having a pore diameter of 30 μm, to prepare a coating solution F for an anti-glare layer.

(Preparation of a Coating Solution G for Anti-Glare Layer)

217.0 g of a hardcoat coating solution containing a dispersion of zirconium oxide (contained 71 weight % of zirconium oxide, trade name: KZ-7991, manufactured by JSR Corporation) was added to a mixed solvent of 104.1 g of cyclohexanone and 61.3 g of methyl ethyl ketone, while stirring using an air disperser. The coating film obtained by applying this solution and by curing the applied solution using ultraviolet rays, had a refractive index of 1.70.

5 g of crosslinkable polystyrene particles (trade name: SX-500H, manufactured by Soken Chemical & Engineering Co., Ltd.) having an average particle diameter of 5 μm was further added to this solution, and the mixture was stirred for one hour using a high speed disperser at 5000 rpm to disperse, followed by filtration using a polypropylene filter having a pore diameter of 30 μm, to prepare a coating solution G for an anti-glare layer.

(Preparation of a Coating Solution G for Low-Refractive-Index Layer)

100 g of methyl isobutyl ketone was added to 500 g of a thermally crosslinkable fluorine-containing polymer (JN-7223 (trade name), manufactured by JSR Corporation) having a refractive index of 1.40. The mixture was stirred and then subjected to filtration using a polypropylene filter having a pore diameter of 1 μm, to prepare a coating solution G for a low-refractive-index layer.

(Preparation of a Coating Solution for an Alignment Layer)

To 30 g of a linear alkyl-modified polyvinyl alcohol (MP-203 (trade name), manufactured by Kuraray Co.) were added 130 g of water and 40 g of methanol. The mixture was stirred for dissolving the resin, and then filtered through a filter made of polypropylene having a pore diameter of 30 μm, to prepare a coating solution for an alignment layer.

(Preparation of a Coating Solution A for an Optical Anisotropic Layer)

In 3.65 g of methyl ethyl ketone were dissolved 1.6 g of the aforesaid Compound No. TE-8 (R=(8), m=4) as a liquid crystalline discotic compound, 0.4 g of phenoxydiethyleneglycol acrylate (M-101 (trade name), manufactured by Toagosei Co., Ltd.), 0.05 g of cellulose acetate butyrate (CAB531-1 (trade name), manufactured by Eastman Chemical Inc.), and 0.01 g of a photopolymerization initiator (Irgacure 907 (trade name), manufactured by Ciba-Geigy Co.). The resultant solution was filtered through a filter, which was made of polypropylene and had a pore diameter of 1 Sun, to prepare a coating solution A for an optical anisotropic layer.

(Preparation of a Coating Solution B for an Optical Anisotropic Layer)

In 3.43 g of methyl ethyl ketone were dissolved 1.8 g of the aforesaid Compound No. TE-8 (R=(8), m=4) as a liquid crystalline discotic compound, 0.2 g of ethylene glycol-modified trimethylolpropane triacrylate (V#360 (trade name), manufactured by Osaka Organic Chemical Co.), 0.04 g of cellulose acetate butyrate (CAB531-1 (trade name), manufactured by Eastman Chemical Inc.), 0.06 g of a photopolymerization initiator (Irgacure 907 (trade name), manufactured by Ciba-Geigy Co.) and 0.02 g of a photosensitizer (Kayacure-DETX (trade name), manufactured by Nihon Kayaku Co., Ltd.). The resultant solution was filtered through a filter made of polypropylene having a pore diameter of 1 μm, to prepare a coating solution B for an optical anisotropic layer.

(Preparation of a Coating Solution C for an Optical Anisotropic Layer)

In 7.2 g of methyl ethyl ketone was dissolved 1.8 g of the aforesaid Compound No. TE-8 (R=(3)), and the solution was filtered through a filter that was made of polypropylene and had a pore diameter of 1 μm, to prepare a coating solution C for an optical anisotropic layer.

Example 1

The aforementioned coating solution A for hardcoat layer was applied to an 80-μm-thick triacetyl cellulose film (trade name: TAC-TD80U, manufactured by Fuji Photo Film Co Ltd.) by using a bar coater, and dried at 120° C. ultraviolet rays were then applied to the coating layer at an illuminance of 400 mW/cm$^2$ and an irradiation dose of 300 mJ/cm$^2$ by using a 160 W/cm air-cooled metal halide lamp (manufactured by Eye Graphics Co., Ltd.) to cure the coating layer, thereby forming a hardcoat layer having a thickness of 4 μm.

The aforementioned coating solution A for anti-glare layer was applied to the hardcoat layer by using a bar coater, and dried and cured by ultraviolet rays in the same conditions as in the preparation of the hardcoat layer, to form an anti-glare layer having a thickness of about 1.5 μm.

The aforementioned coating solution A for low-refractive-index layer was applied to the anti-glare layer by using a bar coater. The coating solution was dried at 80° C., and further heated at 120° C. to effect thermal crosslinking for 10 minutes, to form a low-refractive-index layer with a thickness of 0.096 μm.

Example 2

A hardcoat layer was formed on an 80-μm-thick triacetyl cellulose film (TAC-TD80U (trade name), manufactured by Fuji Photo Film Co., Ltd.) in the same manner as in Example 1.

The aforementioned coating solution B for anti-glare layer was applied to the hardcoat layer by using a bar coater, and dried and cured by ultraviolet rays in the same condition as in the preparation of the above hardcoat layer, to form an anti-glare layer having a thickness of about 1.5 μm.

The aforementioned coating solution A for low-refractive-index layer was applied to the anti-glare layer by using a bar coater. The coating solution was dried at 80° C. and further heated at 120° C. to effect thermal crosslinking for 10 minutes, to form a low-refractive-index layer with a thickness of 0.096 μm.

Example 3

A hardcoat layer was formed on an 80-μm-thick triacetyl cellulose film (TAC-TD80U (trade name), manufactured by Fuji Photo Film Co., Ltd.) in the same manner as in Example 1.

The aforementioned coating solution C for anti-glare layer was applied to the hardcoat layer by using a bar coater, and dried and cured by ultraviolet rays in the same condition as in the preparation of the hardcoat layer, to form an anti-glare layer having a thickness of about 1.5 μm.

The aforementioned coating solution A for low-refractive-index layer was applied to the anti-glare layer by using a bar coater. The coating solution was dried at 80° C., and further heated at 120° C. to effect thermal crosslinking for 10 minutes, to form a low-refractive-index layer with a thickness of 0.096 μm.

Comparative Example 1

The aforementioned coating solution A for hardcoat layer was applied to an 80-μm-thick triacetyl cellulose film (TAC-TD80U (trade name), manufactured by Fuji Photo Film Co., Ltd.) by using a bar coater, and thus coated solution was dried at 120° C. Ultraviolet rays were then applied to the coating layer at an illuminance of 400 mW/cm$^2$ and an irradiation dose of 300 mJ/cm$^2$ by using a 160 W/cm air-cooled metal halide lamp (manufactured by Eye Graphics Co., Ltd.) to cure the coating layer, thereby forming a hardcoat layer having a thickness of 4 μm.

A coating solution for anti-glare layer that contained the same ingredients as in the aforementioned coating solution A for anti-glare layer, except that MPSMA was all replaced by DPHA, was prepared. Thus-prepared coating solution for anti-glare layer was applied to the hardcoat layer by using a bar coater, and dried and cured by ultraviolet rays in the same condition as in the preparation of the hardcoat layer, to form an anti-glare layer having a thickness of about 1.5 μm. It is to be noted that, in the coating solution for anti-glare layer used in this comparative example, the refractive index of the coating film of the solution before addition of SX-200H, obtained after application and ultraviolet-curing was 1.51.

The aforementioned coating solution A for low-refractive-index layer was applied to the anti-glare layer by using a bar coater. The coated solution was dried at 80° C., and further heated at 120° C. to effect thermal crosslinking for 10 minutes, to form a low-refractive-index layer having a thickness of 0.096 μm.

Comparative Example 2

A 4 μm-thick hardcoat layer was formed on an 80-μm-thick triacetyl cellulose film (TAC-TD80U (trade name), manufactured by Fuji Photo Film Co., Ltd.) in the same manner as in Comparative Example 1.

The aforementioned coating solution A for anti-glare layer was applied to the hardcoat layer by using a bar coater, and dried and cured by ultraviolet rays in the same condition as in the preparation of the above hardcoat layer, to form an anti-glare layer having a thickness of about 1.5 μm.

A coating solution for low-refractive-index layer comprising a silica sol (methanol silica sol, manufactured by Nissan Chemical Industries Ltd.) and a hydrolysate of tetraethoxysilane, was applied to the anti-glare layer by using a bar coater. The coating solution was dried at 80° C., and further heated at 120° C. to effect thermal crosslinking for 10 minutes, to form a low-refractive-index layer with a thickness of 0.096 μm and a refractive index of 1.43.

(Evaluation of the Anti-Reflection Film)

As for the resultant films, the following items were evaluated:

(1) Average Specular Reflectance

Using a spectrophotometer (made by JASCO Corp.), spectral reflectance, based on an incident angle of 5°, in the wavelength range of 380 to 780 nm, was measured. The result was represented by the average specular reflectance in 450 to 650 nm.

(2) Haze

A haze of the resultant films were measured by the aid of a haze meter Model 1001DP (trade name, manufactured by Nihon Denshoku Kogyo KK).

(3) Evaluation of Pencil Scratching Test

The evaluation of pencil scratching test disclosed in JIS K 5400 was carried out, as an index of scratch-resistance. After adjusting moisture of the anti-reflection film at 25° C. and a relative humidity of 60% RH for 2 hours, a scratch test was carried out according to JIS S 6006 by using test pencil of 3H, under a load of 1 kg. Scratch formation was evaluated according to the following criteria.

In the evaluation of n=5, no scratch was detected:○.

In the evaluation of n=5, 1 or 2 scratch marks were detected:Δ

In the evaluation of n=5, at least 3 scratch marks were detected:X (4) Contact Angle and Evaluation of Fingerprint Adhesion As an index of stain-proofing property of the surface of an optical material, the moisture of the optical material was adjusted at a temperature of 25° C. and a humidity of 60% RH for 2 hours. Thereafter, its contact angle with water was measured. In addition, fingerprints were caused to adhere onto the surface of this sample, and then they were wiped out with a cleaning cloth. The state thereof was observed to evaluate fingerprint adhesion according to the following ranks.

The fingerprints were completely wiped out:○

The fingerprints were somewhat wiped out:Δ

The fingerprints were hardly wiped out:X (5) Measurement of Dynamic Friction Coefficient The measurement of dynamic friction coefficient was carried out as an index of a surface-sliding property. The sample film was adjusted in humidity at 25° C. and a relative humidity of 60% RH for 2 hours, and then measured by a HEIDON-14 (trade name) dynamic friction tester under conditions of employing stainless steel balls having a diameter of 5 mmø, a load of 100 g, at a velocity of 60 cm/min, and the measured value was used as a dynamic friction coefficient.

(6) Evaluation of Anti-Glare Property

An image of a fluorescent lamp (8000 cd/m$^2$) without any louver was projected on the produced anti-glare film, and then the degree of the haziness of the reflection image was evaluated according to the following criteria.

The outline of the fluorescent lamp was not recognized at all:⊙

The outline of the fluorescent lamp was slightly recognized:○

The fluorescent lamp was hazy, but the outline thereof was able to be recognized:Δ

The fluorescent lamp was hardly hazy:X (7) Evaluation for Glittering

Diffused light from a fluorescent lamp with a louver was allowed to reflect on the manufactured anti-glare film to evaluate the glittering of the surface, according to the following criteria.

Almost no glittering was observed:○

Slight glittering was observed:Δ

Glittering with a discriminating size with the eye was observed:X

The results of the examples and comparative examples are shown in Table 1. The examples 1, 2 and 3 all were excellent in anti-reflection property, and were superior in all qualities, such as scratch-resistance, resistance to fingerprint adhesion, anti-glare property, and prevention for glittering, required for an anti-glare and anti-reflection film.

With regard to Comparative Example 1, the refractive index of the anti-glare layer was low, and therefore only insufficient anti-reflection property. (reflectance) was obtained.

With regard to Comparative Example 2, the contact angle of the low-refractive-index layer was high, and therefore the resistance to fingerprint adhesion was inferior.

TABLE 1

|  | Reflectance [%] | Haze [%] | Pencil scratching test (3H) | Contact angle [°] | Fingerprint adhesion | Dynamic friction coefficient [-] | Anti-glare property | Glittering |
|---|---|---|---|---|---|---|---|---|
| Example 1 | 1.7 | 7 | ○ | 103 | ○ | 0.08 | ⊙ | ○ |
| Example 2 | 1.7 | 7 | ○ | 103 | ○ | 0.08 | ⊙ | ○ |
| Example 3 | 1.2 | 10 | ○ | 103 | ○ | 0.08 | ⊙ | ○ |
| Comparative example 1 | 2.5 | 7 | ○ | 103 | ○ | 0.08 | ⊙ | ○ |
| Comparative example 2 | 1.7 | 7 | ○ | 30 | x | 0.40 | ⊙ | ○ |

Next, an anti-glare and anti-reflection polarizing plate was manufactured using the film of Example 2. Using this polarizing plate, a liquid crystal display device in which the anti-reflection layer was disposed on the outermost surface was manufactured. As a consequence, the device exhibited excellent contrast with no reflective imaging by the reflection of external light. Also, the device exhibited excellent visibility with inconspicuous reflected image due to anti-glare property, was prevented from occurrence of uneven color, and exhibited good fingerprint resistance.

Example 4

The aforementioned coating solution D for an anti-glare hardcoat layer was applied to an 80-μm-thick triacetyl cellulose film (trade name: TAC-TD80U, manufactured by Fuji Photo Film Co., Ltd.) by using a bar coater and dried at 120° C. Ultraviolet rays were then applied to the coating layer at an illuminance of 400 mW/cm$^2$ and an irradiation dose of 300 mJ/cm$^2$ by using a 160 W/cm air-cooled metal halide lamp (manufactured by Eye Graphics Co., Ltd.) to cure the coating layer, thereby forming an anti-glare hardcoat layer having a thickness of 6 μm. The content of silica particles having a particle diameter larger than 3 μm, which was ½ the film thickness of the anti-glare hardcoat layer, was about 50%.

The aforementioned coating solution B for low-refractive-index layer was applied on the anti-glare layer by using a bar coater. The coating solution was dried at 80° C., and further heated at 120° C. to effect thermal crosslinking for 10 minutes, to form a low-refractive-index layer with a thickness of 0.096 μm.

Comparative Example 3

A comparative sample was prepared in the same manner as in Example 4, except that the coating solution D for low-refractive-index layer was used in place of the coating solution B for low-refractive-index layer.

Comparative Example 4

A comparative sample was prepared in the same manner as in Example 4, except that the coating solution B for low-refractive-index layer was not used.

Example 5

The aforementioned coating solution A for hardcoat layer was applied to an 80-μm-thick triacetyl cellulose film (TAC-TD80U (trade name), manufactured by Fuji Photo Film Co., Ltd.) by using a bar coater and dried at 120° C. Ultraviolet rays were then applied to the coating layer at an illuminance of 400 mw/cm$^2$ and an irradiation dose of 300 mJ/cm$^2$ by using a 160 W/cm air-cooled metal halide lamp (manufactured by Eye Graphics Co., Ltd.) to cure the coating layer, thereby forming a hardcoat layer having a thickness of 4 μm.

The aforementioned coating solution A for anti-glare hardcoat layer was applied on the hardcoat layer by using a bar coater, and dried and cured by ultraviolet rays in the same conditions as in the preparation of the above hardcoat layer, to form an anti-glare hardcoat layer having a thickness of about 1.5 μm.

The aforementioned coating solution B for low-refractive-index layer was applied to the anti-glare hardcoat layer by using a bar coater. The coating solution was dried at 80° C., and further heated at 120° C. to effect thermal crosslinking for 10 minutes, to form a low-refractive-index layer with a thickness of 0.096 μm.

Comparative Example 5

A comparative sample was prepared in the same manner as in Example 5, except that the coating solution D for low-refractive-index layer was used in place of the coating solution B for low-refractive-index layer.

Example 6

The aforementioned coating solution A for hardcoat layer was applied to an 80-μm-thick triacetyl cellulose film (TAC-TD80U (trade name), manufactured by Fuji Photo Film Co., Ltd.) by using a bar coater and dried at 120° C. Ultraviolet rays were then applied to the coating layer at an illuminance of 400 mW/cm$^2$ and an irradiation dose of 300 mJ/cm$^2$ by using a 160 W/cm air-cooled metal halide lamp (manufactured by Eye Graphics Co., Ltd.) to cure the coating layer, thereby forming a hardcoat layer having a thickness of 4 μm.

The aforementioned coating solution C for anti-glare hardcoat layer C was applied on the hardcoat layer by using a bar coater, and the solution was dried and cured by ultraviolet rays in the same conditions as in the preparation of the hardcoat layer, to form an anti-glare hardcoat layer having a thickness of about 1.5 μm.

The aforementioned coating solution B for low-refractive-index layer was applied to the anti-glare hardcoat layer by using a bar coater. The coating solution was dried at 80° C., and further heated at 120° C. to effect thermal crosslinking for 10 minutes, to form a low-refractive-index layer with a thickness of 0.096 μm.

Example 7

A sample was prepared in the same manner as in Example 6, except that the coating solution C for low-refractive-index layer was used in place of the coating solution B for low-refractive-index layer.

Comparative Example 6

A comparative sample was prepared in the same manner as in Example 6, except that the coating solution D for low-refractive-index layer was used in place of the coating solution B for low-refractive-index layer.

Comparative Example 7

A comparative sample was prepared in the same manner as in Example 6, except that the coating solution E for low-refractive-index layer was used in place of the coating solution B for low-refractive-index layer.

Comparative Example 8

A comparative sample was prepared in the same manner as in Example 6, except that the coating solution F for low-refractive-index layer was used in place of the coating solution B for low-refractive-index layer.

(Evaluation of the Anti-Reflection Film)

As for the resultant films, the following items (1) to (7) were evaluated in the same manner as described in the above.

(1) Average specular reflectance
(2) Haze
(3) Evaluation of pencil scratching test
(4) Contact angle and evaluation of fingerprint adhesion
(5) Measurement of dynamic friction coefficient
(6) Evaluation of anti-glare property
(7) Evaluation for glittering The results of the examples and comparative examples are shown in Table 2. The examples 4 to 7 all were excellent in anti-reflection property, and were superior in all qualities, such as scratch-resistance, resistance to fingerprint adhesion, anti-glare property, and prevention for glittering, required for an anti-glare and anti-reflection film.

Comparative Examples 3, 5 and 6 were inferior in pencil scratching test and had insufficient scratch-resistance due to absence of inorganic fine particle in the low-refractive-index layer.

In the case of Comparative Example 4, no anti-reflection property was observed, and the attached fingerprints were almost not wiped off because Comparative Example 2 had no low-refractive-index layer.

With regard to Comparative Example 7, the internal scattering in the low-refractive-index layer became large, because silica having a large particle diameter was used in the low-refractive-index layer. Therefore, in Comparative Example 7, both haze and reflectance were deteriorated.

With regard to Comparative Example 8, the result in pencil scratching test was bad, and scratch-resistance was insufficient, because organic fine particles were used in the low-refractive-index layer.

TABLE 2

| | Reflectance [%] | Haze [%] | Pencil scratching test (3H) | Contact angle [°] | Fingerprint adhesion | Dynamic friction coefficient [−] | Anti-glare property | Glittering |
|---|---|---|---|---|---|---|---|---|
| Example 4 | 1.7 | 7.3 | ○ | 103 | ○ | 0.08 | ⊚ | ○ |
| Comparative example 3 | 1.6 | 7.2 | x | 104 | ○ | 0.07 | ⊚ | ○ |
| Comparatve example 4 | 4.5 | 8.0 | ○ | 65 | x | 0.39 | ⊚ | ○ |
| Example 5 | 1.4 | 7.2 | ○ | 103 | ○ | 0.08 | ⊚ | ○ |
| Comparative example 5 | 1.2 | 7.1 | x | 104 | ○ | 0.07 | ⊚ | ○ |
| Example 6 | 1.1 | 9.2 | ○ | 103 | ○ | 0.08 | ⊚ | ○ |
| Example 7 | 1.0 | 9.4 | ○ | 104 | ○ | 0.08 | ⊚ | ○ |
| Comparative example 6 | 1.0 | 9.0 | x | 104 | ○ | 0.07 | ⊚ | ○ |
| Comparative example 7 | 3.0 | 22.0 | ○ | 103 | ○ | 0.08 | ⊚ | ○ |
| Comparative example 8 | 1.3 | 9.2 | x | 103 | ○ | 0.08 | ⊚ | ○ |

Next, anti-glare reflection-preventing polarizing plates were manufactured using the film of Examples 4 to 7, respectively. Using these polarizing plates, liquid crystal display devices, in each of which one of the anti-reflection layers was disposed on the outermost surface, were manufactured. As a consequence, these devices exhibited excellent contrast with no reflective imaging by the reflection of external light. Also, the devices exhibited excellent visibility with inconspicuous reflected image due to the anti-glare property.

Example 8

The aforementioned coating solution E for an anti-glare layer was applied to an 80-μm-thick triacetyl cellulose film (trade name: TAC-TD80U, manufactured by Fuji Photo Film Co., Ltd.) by using a bar coater and dried at 120° C. Ultraviolet rays were then applied to the coating layer at an illuminance of 400 mW/cm² and an irradiation dose of 300 mJ/cm² by using a 160 W/cm air-cooled metal halide lamp (manufactured by Eye Graphics Co., Ltd.) to cure the coating layer, thereby forming an anti-glare layer having an average film thickness of 3.5 μm.

The aforementioned coating solution A for low-refractive-index layer was applied on the anti-glare layer by using a bar coater. The coating solution was dried at 80° C., and further heated at 120° C. to effect thermal crosslinking for 10 minutes, to form a low-refractive-index layer with a thickness of 0.096 μm.

Example 9

The aforementioned coating solution F for an anti-glare layer was applied to an 80-μ-thick triacetyl cellulose film (TAC-TD80U (trade name), manufactured by Fuji Photo Film Co., Ltd.) by using a bar coater and dried at 120° C. Ultraviolet rays were then applied to the coating layer at an illuminance of 400 mw/cm² and an irradiation dose of 300 mJ/cm² by using a 160 W/cm air-cooled metal halide lamp (manufactured by Eye Graphics Co., Ltd.) to cure the coating layer, thereby forming an anti-glare layer having an average film thickness of 3.5 μm.

The aforementioned coating solution A for low-refractive-index layer was applied to the anti-glare layer by using a bar coater. The coating solution was dried at 80° C., and further heated at 120° C. to effect thermal crosslinking for 10 minutes, to form a low-refractive-index layer with a thickness of 0.096 μm.

Example 10

The aforementioned coating solution G for an anti-glare layer was applied to an 80-tμm-thick triacetyl cellulose film (TAC-TD80U (trade name), manufactured by Fuji Photo Film Co., Ltd.) by using a bar coater and dried at 120° C. Ultraviolet rays were then applied to the coating layer at an illuminance of 400 mW/cm² and an irradiation dose of 300 mJ/cm² by using a 160 W/cm air-cooled metal halide lamp (manufactured by Eye Graphics Co., Ltd.) to cure the coating layer, thereby forming an anti-glare layer having an average film thickness of 3.5 μm.

The aforementioned coating solution A for low-refractive-index layer was applied on the anti-glare layer by using a bar coater. The coating solution was dried at 80° C., and further heated at 120° C. to effect thermal crosslinking for 10 minutes, to form a low-refractive-index layer with a thickness of 0.096 μm.

Comparative Example 9

A coating solution for anti-glare layer was prepared in the same manner as the aforementioned coating solution E for anti-glare layer, except that MPSMA was all replaced by DPHA. Thus-prepared coating solution for anti-glare layer was applied to an 80-μ-thick triacetyl cellulose film (TAC-TD80U (trade name), manufactured by Fuji Photo Film Co., Ltd.) by using a bar coater, and dried and cured by ultraviolet rays in the same conditions as in comparative example 9, to form an anti-glare layer having a thickness of about 3.5 μm. The refractive index of the anti-glare layer was 1.51.

The aforementioned coating solution A for low-refractive-index layer was applied on the anti-glare layer by using a bar coater. The coating solution was dried at 80° C. and further heated at 120° C. to effect thermal crosslinking for 10 minutes, to form a low-refractive-index layer with a thickness of 0.096 μm.

Comparative Example 10

A hardcoat layer having an average thickness of 3.5 μm was formed on an 80-μ-thick triacetyl cellulose film (TAC-TD80U (trade name), manufactured by Fuji Photo Film Co., Ltd.) in the same manner as in Comparative Example 9.

A coating solution for low-refractive-index layer comprising a silica sol (methanol silica sol, manufactured by Nissan Chemical Industries, Ltd.) and a hydrolysate of tetraethoxysilane, was applied to the hard coat by using a bar coater. The coating solution was dried at 80° C., and further heated at 120° C. to effect thermal crosslinking for 10 minutes, to form a low-refractive-index layer with a thickness of 0.096 μm, and a refractive index of 1.43.

(Evaluation of the anti-reflection film)

As for the resultant films, the following items (1) to (7) were evaluated in the same manner as described in the above.

(1) Average specular reflectance
(2) Haze
(3) Evaluation of pencil scratching test
(4) Contact angle and evaluation of fingerprint adhesion
(5) Measurement of dynamic friction coefficient
(6) Evaluation of glare
(7) Evaluation for glittering The results of the examples and comparative examples are shown in Table 3. The examples 8 to 10 all were excellent in anti-reflection property, and were superior in all qualities, such as scratch-resistance, resistance to fingerprint adhesion, anti-glare property, and prevention for glittering, required for an anti-glare and anti-reflection film.

With regard to Comparative Example 9, the refractive index of the anti-glare layer was low, and hence only insufficient anti-reflection property (reflectance) was obtained.

With regard to Comparative Example 10, the contact angle of the low-refractive-index layer was low, and therefore the resistance to fingerprint adhesion was inferior.

the aid of a bar coater, dried at 80° C., and heated at 120° C. for 10 minutes to effect thermal crosslinking, to form a low-refractive-index layer having a thickness of 0.096 μm, thereby manufacturing a film having an anti-reflection layer.

(Preparation of an Optical Compensative Film)

The aforesaid coating solution for an alignment layer was coated onto a triacetylcellulose film (manufactured by Fuji Photo Film Co., Ltd.), which had a subbing layer of a gelatin thin film (0.1 μm) and had a thickness of 120 μm, by the aid of a bar coater, and dried at 60° C. The coated layer was subjected to a rubbing treatment, to form an alignment layer having a thickness of 0.5 μm on the film.

The thickness of the triacetylcellulose film provided with the alignment layer was measured by a micrometer, and retardation from various directions was measured by way of an ellipsometer (AEP-100 (trade name), manufactured by Shimadzu Co.), to determine the aforesaid |nx−ny|×d and {(nx+ny)/2−nz}×d. As result, |nx−ny|×d was 3 nm, and {(nx+ny)/2−nz}×d was 60 nm. Namely, this triacetylcellulose film was approximately a negative uniaxial film, and its light axis was nearly a direction to the normal line of the film.

The aforesaid coating solution A for an optical anisotropic layer was coated onto the alignment layer, by the aid of a bar coater, dried at 120° C., then heated for further 3 minutes to effect aging of the liquid crystal thereby aligning the discotic compound. Thereafter, the layer was irradiated with UV-rays at an irradiation dose of 300 mJ/cm² and an illuminance of 400 mW/cm² using a 160 W/cm air-cooled metal halide

TABLE 3

| | Reflectance [%] | Haze [%] | Pencil scratching test (3H) | Contact angle [°] | Fingerprint adhesion | Dynamic friction coefficient [−] | Anti-glare property | Glittering |
|---|---|---|---|---|---|---|---|---|
| Example 8 | 1.7 | 7 | ○ | 103 | ○ | 0.08 | ⊚ | ○ |
| Example 9 | 1.7 | 7 | ○ | 103 | ○ | 0.08 | ⊚ | ○ |
| Example 10 | 1.2 | 10 | ○ | 103 | ○ | 0.08 | ⊚ | ○ |
| Comparative example 9 | 2.5 | 7 | ○ | 103 | ○ | 0.08 | ⊚ | ○ |
| Comparative example 10 | 1.7 | 7 | ○ | 30 | x | 0.40 | ⊚ | ○ |

Next, an anti-glare and anti-reflection polarizing plate was manufactured using the film of Example 10. Using this polarizing plate, a liquid crystal display device in which the anti-reflection layer was disposed on the outermost surface was manufactured. As a consequence, the device attained excellent contrast without reflective image due to the reflection of external light. Also, the device was free from uneven color, and it attained excellent visibility with inconspicuous reflected image due to the anti-glare property, and excellent fingerprint adhesion resistance.

Example 11

(Preparation of an Anti-Reflection Film)

The aforesaid coating solution B for an anti-glare layer was coated onto a triacetylcellulose film (manufactured by Fuji Photo Film Co., Ltd.) having a thickness of 80 μm by the aid of a bar coater. Thereafter, the film was dried at 120° C., and then irradiated with UV-rays at an irradiation dose of 300 mJ/cm² and an illuminance of 400 mW/cm² using a 160 W/cm air-cooled metal halide lamp (manufactured by Eye Graphics Co., Ltd.), to cure the coated layer, to form a hard coat layer having a thickness of 4 μm.

Next, the aforesaid coating solution A for a low-refractive-index layer was coated onto the hard coat layer by lamp (manufactured by EYE Graphics Co., Ltd.) while maintaining the temperature at 120° C., to cure the coated layer to form an optical anisotropic layer having a thickness of 1.8 μm, thereby manufacturing an optical compensative film.

(Preparation of a Polarizing Plate)

The aforesaid anti-reflection film and the optical compensative film were subjected to a saponifying treatment with an aqueous solution of 1.5 N NaOH. A polarizing layer comprised of iodine-doped stretched polyvinyl alcohol was put between the anti-reflection film and the optical compensative film on the side of their triacetylcellulose surface and adhered, to prepare a polarizing plate of Example 11.

Example 12

The aforesaid coating solution A for a hard coat layer was coated onto a triacetylcellulose film (manufactured by Fuji Photo Film Co., Ltd.) having a thickness of 80 μm, by the aid of a bar coater. Thereafter, the film was dried at 120° C., and then irradiated with UV-rays at an irradiation dose of 300 mJ/cm² and an illuminance of 400 mW/cm² using a 160 W/cm air-cooled metal halide lamp (manufactured by EYE Graphics Co., Ltd.), to cure the coated layer, and thereby a hard coat layer having a thickness of 4 μm was formed.

The aforementioned coating solution A for an anti-glare layer was applied on it by using a bar coater, and dried and cured by ultraviolet rays in the same conditions as in the case of the aforementioned hardcoat layer, to form an anti-glare layer having a thickness of about 1.5 µm.

The aforementioned coating solution A for low-refractive-index layer was applied to the anti-glare layer by using a bar coater, dried at 80° C., and further thermally crosslinked at 120° C. for 10 minutes, to form a low-refractive-index layer with a thickness of 0.096 µm, thereby making a film having an anti-reflection layer.

A polarizing plate of Example 12 was produced in the same manner as Example 11, except that this anti-reflection film was used.

Example 13

The aforesaid coating solution A for a hard coat layer was coated onto a triacetylcellulose film (manufactured by Fuji Photo Film Co., Ltd.) having a thickness of 80 µm by the aid of a bar coater. Thereafter, the film was dried at 120° C., and then irradiated with UV-rays at an irradiation dose of 300 mJ/cm$^2$ and an illuminance of 400 mW/cm$^2$ using a 160 W/cm air-cooled metal halide lamp (manufactured by EYE Graphics Co., Ltd.), to cure the coated layer, thereby a hard coat layer having a thickness of 4 µm was formed.

The aforementioned coating solution C for an anti-glare layer was applied to it by using a bar coater, and dried and cured by ultraviolet rays in the same conditions as in the case of the aforementioned hardcoat layer, to form an anti-glare layer having a thickness of about 1.5 µm.

The aforementioned coating solution A for low-refractive-index layer was applied to the anti-glare layer by using a bar coater, dried at 80° C., and further thermally crosslinked at 120° C. for 10 minutes, to form a low-refractive-index layer with a thickness of 0.096 µm, and thereby making a film having an anti-reflection layer.

A polarizing plate of Example 13 was produced in the same manner as Example 11, except that this anti-reflection film was used.

Example 14

The aforesaid coating solution A for a hard coat layer was coated onto a triacetylcellulose film (manufactured by Fuji Photo Film Co., Ltd.) having a thickness of 80 µm by the aid of a bar coater. Thereafter, the film was dried at 120° C., and then irradiated with UV-rays at an irradiation dose of 300 mJ/cm$^2$ and an illuminance of 400 mW/cm$^2$ using a 160 W/cm air-cooled metal halide lamp (manufactured by EYE Graphics Co., Ltd.), to cure the coated layer, thereby a hard coat layer having a thickness of 4 µm was formed.

The aforementioned coating solution A for an anti-glare layer was applied to it by using a bar coater, and dried and cured by ultraviolet rays in the same conditions as in the case of the aforementioned hardcoat layer, to form an anti-glare layer having a thickness of about 1.5 µm.

The aforementioned coating solution G for low-refractive-index layer was applied to the anti-glare layer by using a bar coater, dried at 80° C., and further thermally crosslinked at 120° C. for 10 minutes, to form a low-refractive-index layer with a thickness of 0.096 µm, and thereby making a film having an anti-reflection layer.

A polarizing plate of Example 14 was produced in the same manner as Example 11, except that this anti-reflection film was used.

Example 15

The above-mentioned coating solution B for an optical anisotropic layer was applied onto the alignment layer of Example 11, with a bar coater. The applied layer was dried at 120° C., and was further heated for 3 minutes for ripening of the liquid crystal. In this way, its discotic compounds were aligned. Thereafter, the applied layer was irradiated with ultraviolet rays (illuminance: 400 mW/cm$^2$, and radiation dose: 300 mJ/cm$^2$) while keeping the temperature at 120° C., using an air-cooled metal halide lamp having a power of 160 W/cm (made by Eye Graphics Co., Ltd.) to harden the applied layer. In this way, an optical anisotropic layer having a thickness of 1.8 µm was formed to produce an optical compensative film.

A polarizing plate of Example 15 was produced in the same manner as Example 11, except that this optical compensative film was used.

Example 16

The triacetylcellulose surfaces of both the anti-reflection film and the optical compensative film in Example 11 were processed with an adhesive agent. They were separately stuck onto different surfaces of a commercially available polarizing plate (made by Sanritz Corp.) wherein triacetylcellulose was used as a polarizing-layer protecting-film, so as to produce a polarizing plate of Example 16.

Example 17

The triacetylcellulose surface of the optical compensative film in Example 11 was processed with an adhesive agent. A commercially available polarizing plate (made by Sanritz Corp.) was employed, one side of which was composed of triacetylcellulose as a polarizing-layer protecting-film, and the other side of which was composed of triacetylcellulose having an anti-reflection film which was formed by vapor deposition. The optical compensative film in Example 11 was stuck onto the triacetylcellulose protecting-film side of the commercially available polarizing plate, so as to produce a polarizing plate of Example 17.

Comparative Example 11

The aforesaid coating solution A for a hard coat layer was coated onto a triacetylcellulose film (manufactured by Fuji Photo Film Co., Ltd.) having a thickness of 80 µm by the aid of a bar coater. Thereafter, the film was dried at 120° C. and then irradiated with UV-rays at an irradiation dose of 300 mJ/cm$^2$ and an illuminance of 400 mW/cm$^2$ using a 160 W/cm air-cooled metal halide lamp (manufactured by Eye Graphics Co., Ltd.), to cure the coated layer, and thereby a hard coat layer having a thickness of 4 µm was formed.

A polarizing plate of Comparative Example 11 was produced in the same manner as Example 11, except that this hard coat film was used instead of the anti-reflection film.

Comparative Example 12

In the same manner as Example 13, except that a triacetylcellulose film (manufactured by Fuji Photo Film Co., Ltd.) having a thickness of 80 µm was used in place of the optical compensative film, a polarizing plate of Comparative Example 12 was prepared.

Comparative Example 13

The aforesaid coating solution C for an optical anisotropic layer was coated onto the alignment layer of Example 11 by the aid of a bar coater. The layer was dried at 180° C., then heated further for one minute to effect aging of the liquid crystal, and thereby aligning the discotic compound. Then the layer was cooled to room temperature to form an optical anisotropic layer having a thickness of 1.0 μm. In this way, an optical compensative film was prepared.

In the same manner as Example 13, except that this optical compensative film was used, a polarizing plate of Comparative Example 13 was prepared.

(Evaluation of the Anti-Reflection Film)

As for the resultant anti-reflection films, the following items (1) to (6) were evaluated in the same manner as the above description.
(1) Average specular reflectance
(2) Haze
(3) Evaluation of pencil scratching test
(4) Contact angle and evaluation of fingerprint adhesion
(5) Measurement of dynamic friction coefficient
(6) Evaluation of anti-giddiness (Evaluation of the Optical Compensative Film)

As for the resultant optical compensative films, the following items were evaluated:
(1) Haze Haze of the resultant film was measured by the aid of haze meter Model 1001DP (trade name, manufactured by Nihon Denshoku Kogyo KK).
(2) Light axis and variation of inclination angle In the optical compensative film, retardation from all the directions in perpendicular surface to the optical compensative film surface, which perpendicular surface including the rubbing axis, was measured by an ellipsometer (AEP-100 (trade name), manufactured by Shimadzu Co.). Further, retardation of only the support and the alignment layer of the film, from which the optical anisotropic layer of the measured portion had been removed, was likewise measured. By obtaining the optical characteristics (dependency of measuring angle of retardation) of the optical anisotropic layer alone from these two measured values, existence or non-existence of any light axis was investigated, assuming the direction of retardation being zero as light axis. Besides, inclination (variation of inclination angle) of the discotic compound to the surface of the support was calculated by fitting of the optical characteristics.
(3) Size of Domain A size of domain formed in the optical anisotropic layer was measured by observation through a polarizing microscope.

Table 4 shows results of Examples and Comparative Examples.

Next, a liquid crystal display device as shown in FIG. 7 was prepared using the films of Examples 11, 15, 16, and 17, and Comparative Examples 11 to 13, respectively. The same optical compensative film as used in each example was used as an optical compensative film of the front side polarizing plate.

A liquid crystal cell comprising a nematic liquid crystal at a twisted angle of 90° was put between the substrates with a gap size of 4.5 μm.

Figure 10:
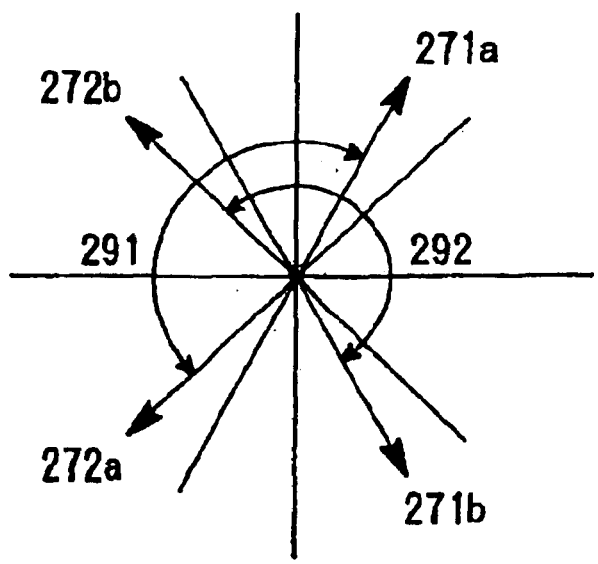
FIG. 10 is a drawing showing a representative construction of FIG. 8, viewing from the direction of the normal line of the film.

As shown in FIG. 10, the construction is such that an angle 291 of a rubbing direction 271a of the down side optical compensative film with a rubbing direction 272a of the down side substrate (liquid crystal cell) is 180°, while an angle 292 of a rubbing direction 271b of the up side optical compensative film with a rubbing direction 272b of the up side substrate is 180°. These elements are disposed as shown in FIG. 8.

(Evaluation of the Liquid-Crystal Display Device)

As for the resultant liquid-crystal display device, the following items were evaluated.
(1) On-axis Contrast Ratio A 55 Hz square wave with voltage of 0 to 5 V was applied to the resultant TN-LCD, and the contrast ratio in the normal to the front surface was measured by the aid of a spectrometer (LCD-5000 (trade name), manufactured by Otsuka Electronics Co., Ltd.).
(2) Viewing Angle A 55 Hz square wave with voltage of 0 to 5 V was applied to the resultant TN-LCD, and the contrast in inclined directions of up/down and left/right was measured by the aid of a spectrometer (LCD-5000 (trade name) manufactured by Otsuka Electronics Co., Ltd.). The viewing angle was defined as angle range of the contrast ratio being at least 10.
(3) Visibility in Room The blackness in black display of the resultant TN-LCD in a room was visually evaluated in accordance with the following items:

⊚: Blackness is very good irrespective of illumination in room

○: Blackness is good though influenced by illumination in room

Δ: Blackness becomes somewhat bad in oblique directions

X: Blackness is bad

Table 5 shows results of each Examples and each Comparative Examples.

TABLE 4

| | Anti-reflection film | | | | | | | Optical compensative film | | | |
|---|---|---|---|---|---|---|---|---|---|---|---|
| | Reflectance | Haze [%] | Pencil scratching test 3H | Contact angle [°] | Fingerprint adhesion | Dynamic friction coefficient [−] | Anti-glare property | Haze [%] | Light axis | Variation of inclination angle [°] | Domain [μm] |
| Example 11 | 2.1 | 5.0 | ○ | 103 | ○ | 0.08 | ⊚ | 1.0 | not present | 20–50 | mono* |
| Example 12 | 1.7 | 7.0 | ○ | 103 | ○ | 0.08 | ⊚ | 1.0 | not present | 20–50 | mono |
| Example 13 | 1.2 | 7.0 | ○ | 103 | ○ | 0.08 | ⊚ | 1.0 | not present | 20–50 | mono |
| Example 14 | 1.0 | 7.0 | Δ | 103 | ○ | 0.18 | ⊚ | 1.0 | not present | 20–50 | mono |
| Example 15 | 2.1 | 5.0 | ○ | 103 | ○ | 0.08 | ⊚ | 0.3 | not present | 20–70 | mono |
| Example 16 | 2.1 | 5.0 | ○ | 103 | ○ | 0.08 | ⊚ | 1.0 | not present | 20–50 | mono |
| Example 17 | 0.2 | 6.0 | ○ | 101 | ○ | 0.34 | ⊚ | 1.0 | not present | 20–50 | mono |
| Comparative Example 11 | 4.1 | 0.1 | ○ | 67 | x | 0.40 | x | 1.0 | not present | 20–50 | mono |
| Comparative Example 12 | 1.2 | 7.0 | ○ | 103 | ○ | 0.08 | ⊚ | — | — | — | — |
| Comparative Example 13 | 1.2 | 7.0 | ○ | 103 | ○ | 0.08 | ⊚ | 7.9 | present | — | 10 |

*mono = monodomain

TABLE 5

| | On-axis contrast | Viewing angle [°] | | Visibility in room |
| | | up/down | left/right | |
|---|---|---|---|---|
| Example 11 | at least 100 | 130 | 125 | ⊚ |
| Example 15 | at least 100 | 130 | 130 | ⊚ |
| Example 16 | at least 100 | 130 | 125 | ⊚ |
| Example 17 | at least 100 | 130 | 125 | ⊚ |
| Comparative example 11 | at least 100 | 130 | 125 | ○ |
| Comparative example 12 | at least 100 | 60 | 95 | Δ |
| Comparative example 13 | 60 | 40 | 65 | × |

Next, a color-liquid-crystal display device was prepared by peeling off a polarizing plate of TFT-type liquid crystal color television 6E-C3 (trade name, manufactured by Sharp Corp.), and using instead the polarizing plates of Examples 11, 15, 16, and 17 and Comparative Examples 11 to 13.
(Evaluation of the Color-Liquid-Crystal Display Device)

As for the resultant liquid-crystal display device, the following items were evaluated.
(1) Viewing Angle The resultant color-liquid-crystal display device was used for its white display and black display, and the contrast in inclined directions up/down and left/right was measured by the aid of a spectrometer (LCD-5000 (trade name), manufactured by Otsuka Electronics Co., Ltd.). The viewing angle was defined as an angle range of the contrast ratio being at least 10.

Table 6 shows results of each Examples and each Comparative Examples.

TABLE 6

| | Viewing angle [°] | |
| | up/down | left/right |
|---|---|---|
| Example 11 | 123 | 115 |
| Example 15 | 130 | 120 |
| Example 16 | 123 | 115 |
| Example 17 | 123 | 115 |
| Comparative example 11 | 123 | 115 |
| Comparative example 12 | 50 | 70 |
| Comparative example 13 | 30 | 55 |

Example 18
(Preparation of a Coating Solution B for a Hardcoat Layer)

A solution that 250 g of an ultraviolet-curable Hardcoat composition (Desolite Z-7526 (trade name), 72 weight %, manufactured by JSR Corporation) was dissolved in a mixture of 62 g of methyl ethyl ketone and 88 g of cyclohexanone, was prepared. When this solution was applied and hardened by ultraviolet rays to obtain a coating film, the refractive index thereof was 1.50.

Further, this solution was filtrated with a filter having a prore size of 30 μm made of polypropylene (PPE-30 (trade name), manufactured by Fuji Photo Film Co., Ltd.), to prepare a coating solution B for a hard coat layer.
(Preparation of a Coating Solution H for an Anti-Glare layer)

91 g of a mixture of dipentaerythritol pentaacrylate and dipentaerythritol hexaacrylate (DPHA (trade name), manufactured by Nippon Kayaku Co., Ltd.), and 218 g of a hardcoat coating solution containing a dispersion of ultrafine particles of zirconium oxide having a particle diameter of about 30 nm (Desolite Z-7041 (trade name), manufactured by JSR Corporation) were dissolved in 52 g of a mixed solvent of methyl ethyl ketone/cyclohexanone (54/46% by weight). The coated film obtained by applying this solution, and then curing the applied solution using ultraviolet rays, had a refractive index of 1.61.

20 g of crosslinkable polystyrene particles (trade name: SX-200HS, manufactured by Soken Chemical & Engineering Co., Ltd.) having a number average particle diameter of 1.99 μm and a standard deviation of particle diameter of 0.32 μm (16% of the number average particle diameter) was added to 80 g of a mixed solvent of methyl ethyl ketone/cyclohexanone (54/46% by weight), and the resultant mixture was stirred for one hour using a high speed disperser at 5000 rpm for dispersing. Thereafter, the thus-obtained dispersion was subjected to filtration using polypropylene filters having a pore diameter of 10 μm, 3 μm, and 1 μm, (respectively, PPE-10, PPE-03, and PPE-01, trade names, manufactured by Fuji Photo Film Co., Ltd.). 29 g of the resulted dispersion was added to the above-prepared solution. After stirring, this mixture was filtrated with a polypropylene filter having a pore diameter of 30 μm, to obtain a coating solution H for an anti-glare layer.
(Preparation of a Coating Solution H for a Low-Refractive-Index Layer)

A coating solution H for a low-refractive-index layer was prepared in the same manner as the coating solution B for a low-refractive-index layer, except that the silica sol MiBK-ST (trade name) was changed to a silica sol MEK-ST (trade name), that methyl isobutyl ketone was changed to methyl ethyl ketone, and that the thermocrosslinkable fluoropolymer JN-7223 (trade name) was changed to a thermocrosslinkable fluoropolymer JN-7228 (trade name).

A sample anti-glare and anti-reflection film was prepared in the same manner as in Example 7, except that the above-mentioned coating solutions (the coating solution B for hardcoat layer, the coating solution H for an anti-glare layer, and the coating solution H for a low-reflective-index layer) were used in stead of the respectively corresponding coating solutions. The thus-obtained sample exhibited the similar properties as those in Example 7 with the same evaluation tests.

Having described our invention as related to the present embodiments, it is our intention that the invention not be limited by any of the details of the description, unless otherwise specified, but rather be construed broadly within its spirit and scope as set out in the accompanying claims.

What we claim is:

1. A polarizing plate, which has a polarizing layer held between two transparent supports, and which comprises an optical compensation layer containing an optically anisotropic layer on one support among the transparent supports on the side opposite to the polarizing layer, and which comprises at least one anti-glare layer and at least one low-refractive-index layer in this order from the support side on another transparent support on the side opposite to the surface that is in contact with the polarizing layer, wherein the optically anisotropic layer is a layer that comprises a compound having a discotic structure unit, in which the disc planes of the discotic structure units are inclined to the surface of the transparent support at angles changing successively along the normal direction through the optically anisotropic layer.

2. The polarizing plate as claimed in claim 1, wherein the angles increase with the increase in distance of the optical anisotropic layer from the surface side of the support.

3. The polarizing plate as claimed in claim 1, wherein the optically anisotropic layer further contains a cellulose ester.

4. The polarizing plate as claimed in claim 1, wherein the transparent support on the side of the optically anisotropic layer has an optically negative uniaxiality, and has an optical axis in the normal direction of the surface of the transparent support, and satisfies the following equation:

$$20 \leq \{(nx+ny)/2-nz\} \times d \leq 400$$

wherein d represents a thickness of the optical compensative layer (unit: nm), nx, ny, and nz represent main refractive indices of three orthogonal axes of the optical compensative layer, nz represents a main refractive index in the direction of thickness of the transparent support, and the axes satisfy a relation of $nx \leq nz \leq ny$, when it is viewed from the front.

5. The polarizing plate as claimed in claim 1, wherein an alignment layer is formed between the optically anisotropic layer and the transparent support.

6. The polarizing plate as claimed in claim 5, wherein the alignment layer comprises a film made of a cured polymer.

7. The polarizing plate as claimed in claim 1, wherein the optically anisotropic layer is a mono-domain or is formed of a number of domains having a size of 0.1 µm or less.

8. A liquid crystal display device comprising the polarizing plate in claim 1, as a display side polarizing plate among two polarizing plates disposed on both sides of a liquid crystal cell, in which the optically anisotropic layer is disposed towards the liquid crystal cell side.

9. A color liquid crystal display device, which comprises a liquid crystal cell comprising a pair of substrates provided with a transparent electrode, a pixel electrode and a color filter, and a twisted nematic liquid crystal that is sealed between the pair of substrates, a pair of optical compensation sheets disposed on both sides of the liquid crystal cell, and a pair of polarizing plates disposed outside of the compensation sheets, wherein the polarizing plate as claimed in claim 1 is used, as the polarizing plate and the optical compensation sheet on the display side of the liquid crystal cell, in which the optically anisotropic layer is disposed towards the liquid crystal cell side, and wherein as the optical compensation sheet on the back light side of the liquid crystal cell, an optical compensation sheet provided with an optically anisotropic layer that comprises a compound having a discotic structure unit is used, in which the disc planes of the discotic structure units are inclined to the surface of the transparent support at angles changing successively along the normal direction through the optically anisotropic layer.

10. A liquid crystal display device comprising the polarizing plate in claim 2 as a display side polarizing plate among two polarizing plates disposed on both sides of a liquid crystal cell, in which the optically anisotropic layer is disposed towards the liquid crystal cell side.

11. A liquid crystal display device comprising the polarizing plate in claim 3, as a display side polarizing plate among two polarizing plates disposed on both sides of a liquid crystal cell, in which the optically anisotropic layer is disposed towards the liquid crystal cell side.

12. A liquid crystal display device comprising the polarizing plate in claim 4 as a display side polarizing plate among two polarizing plates disposed on both sides of a liquid crystal cell, in which the optically anisotropic layer is disposed towards the liquid crystal cell side.

13. A liquid crystal display device comprising the polarizing plate in claim 5 as a display side polarizing plate among two polarizing plates disposed on both sides of a liquid crystal cell, in which the optically anisotropic layer is disposed towards the liquid crystal cell side.

14. A liquid crystal display device comprising the polarizing plate in claim 6 as a display side polarizing plate among two polarizing plates disposed on both sides of a liquid crystal cell, in which the optically anisotropic layer is disposed towards the liquid crystal cell side.

15. A liquid crystal display device comprising the polarizing plate in claim 7 as a display side polarizing plate among two polarizing plates disposed on both sides of a liquid crystal cell, in which the optically anisotropic layer is disposed towards the liquid crystal cell side.

16. A color liquid crystal display device, which comprises a liquid crystal cell comprising a pair of substrates provided with a transparent electrode, a pixel electrode and a color filter, and a twisted nematic liquid crystal that is sealed between the pair of substrates, a pair of optical compensation sheets disposed on both sides of the liquid crystal cell, and a pair of polarizing plates disposed outside of the compensation sheets, wherein the polarizing plate as claimed in claim 2 is used, as the polarizing plate and the optical compensation sheet on the display side of the liquid crystal cell, in which the optically anisotropic layer is disposed towards the liquid crystal cell side, and wherein as the optical compensation sheet on the back light side of the liquid crystal cell, an optical compensation sheet provided with an optically anisotropic layer that comprises a compound having a discotic structure unit is used, in which the disc planes of the discotic structure units are inclined to the surface of the transparent support at angles changing successively along the normal direction through the optically anisotropic layer.

17. A color liquid crystal display device, which comprises a liquid crystal cell comprising a pair of substrates provided with a transparent electrode, a pixel electrode and a color filter, and a twisted nematic liquid crystal that is sealed between the pair of substrates, a pair of optical compensation sheets disposed on both sides of the liquid crystal cell, and a pair of polarizing plates disposed outside of the compensation sheets, wherein the polarizing plate as claimed in claim 3 is used, as the polarizing plate and the optical compensation sheet on the display side of the liquid crystal cell, in which the optically anisotropic layer is disposed towards the liquid crystal cell side, and wherein as the optical compensation sheet on the back light side of the liquid crystal cell, an optical compensation sheet provided with an optically anisotropic layer that comprises a compound having a discotic structure unit and has a negative birefringence is used, in which the disc planes of the discotic structure units are inclined to the surface of the transparent support at angles changing successively along the normal direction through the optically anisotropic layer.

18. A color liquid crystal display device, which comprises a liquid crystal cell comprising a pair of substrates provided with a transparent electrode, a pixel electrode and a color filter, and a twisted nematic liquid crystal that is sealed between the pair of substrates, a pair of optical compensation sheets disposed on both sides of the liquid crystal cell, and a pair of polarizing plates disposed outside of the compensation sheets, wherein the polarizing plate as claimed in claim 4 is used, as the polarizing plate and the optical compensation sheet on the display side of the liquid crystal cell, in which the optically anisotropic layer is disposed towards the liquid crystal cell side, and wherein as the optical compensation sheet on the back light side of the liquid crystal cell, an optical compensation sheet provided with an optically anisotropic layer that comprises a compound having a discotic structure unit is used, in which the disc planes of the discotic structure units are inclined to the surface of the transparent support at angles changing successively along the normal direction through the optically anisotropic layer.

19. A color liquid crystal display device, which comprises a liquid crystal cell comprising a pair of substrates provided with a transparent electrode, a pixel electrode and a color filter, and a twisted nematic liquid crystal that is sealed between the pair of substrates, a pair of optical compensation sheets disposed on both sides of the liquid crystal cell, and a pair of polarizing plates disposed outside of the compensation sheets, wherein the polarizing plate as claimed in claim 5 is used, as the polarizing plate and the optical compensation sheet on the display side of the liquid crystal cell, in which the optically anisotropic layer is disposed towards the liquid crystal cell side, and wherein as the optical compensation sheet on the back light side of the liquid crystal cell, an optical compensation sheet provided with an optically anisotropic layer that comprises a compound having a discotic structure unit is used, in which the disc planes of the discotic structure units are inclined to the surface of the transparent support at angles changing successively along the normal direction through the optically anisotropic layer.

20. A color liquid crystal display device, which comprises a liquid crystal cell comprising a pair of substrates provided with a transparent electrode, a pixel electrode and a color filter, and a twisted nematic liquid crystal that is sealed between the pair of substrates, a pair of optical compensation sheets disposed on both sides of the liquid crystal cell, and a pair of polarizing plates disposed outside of the compensation sheets, wherein the polarizing plate as claimed in claim 6 is used, as the polarizing plate and the optical compensation sheet on the display side of the liquid crystal cell, in which the optically anisotropic layer is disposed towards the liquid crystal cell side, and wherein as the optical compensation sheet on the back light side of the liquid crystal cell, an optical compensation sheet provided with an optically anisotropic layer that comprises a compound having a discotic structure unit is used, in which the disc planes of the discotic structure units are inclined to the surface of the transparent support at angles changing successively along the normal direction through the optically anisotropic layer.

21. A color liquid crystal display device, which comprises a liquid crystal cell comprising a pair of substrates provided with a transparent electrode, a pixel electrode and a color filter, and a twisted nematic liquid crystal that is sealed between the pair of substrates, a pair of optical compensation sheets disposed on both sides of the liquid crystal cell, and a pair of polarizing plates disposed outside of the compensation sheets, wherein the polarizing plate as claimed in claim 7 is used, as the polarizing plate and the optical compensation sheet on the display side of the liquid crystal cell, in which the optically anisotropic layer is disposed towards the liquid crystal cell side, and wherein as the optical compensation sheet on the back light side of the liquid crystal cell, an optical compensation sheet provided with an optically anisotropic layer that comprises a compound having a discotic structure unit is used, in which the disc planes of the discotic structure units are inclined to the surface of the transparent support at angles changing successively along the normal direction through the optically anisotropic layer.

22. A color liquid crystal display device, which comprises a liquid crystal cell comprising a pair of substrates provided with a transparent electrode, a pixel electrode and a color filter, and a twisted nematic liquid crystal that is sealed between the pair of substrates, a pair of optical compensation sheets disposed on both sides of the liquid crystal cell, and a pair of polarizing plates disposed outside of the compensation sheets, wherein a polarizing plate is used and the optical compensation sheet on the display side of the liquid crystal cell, in which the optically anisotropic layer is disposed towards the liquid crystal cell side, and wherein as the optical compensation sheet on the back light side of the liquid crystal cell, an optical compensation sheet provided with an optically anisotropic layer that comprises a compound having a discotic structure unit is used, in which the disc planes of the discotic structure units are inclined to the surface of the transparent support at angles changing successively along the normal direction through the optically anisotropic layer wherein the polarizing plate has one of two protective films being an anti-glare and anti-reflection film, and another protective film comprises an optical compensation layer containing an optically anisotropic layer on the support of said protective film on the side opposite to the support surface which is in contact with the polarizing layer, and wherein the anti-glare and anti-reflection film has a transparent support and at least one low-reflective index comprising a fluorine-containing resin and having a refractive index in the range from 1.38 to 1.49, wherein the anti-glare and anti-reflection film comprises the anti-glare layer that is disposed between the transparent support and the low-refractive-index layer and that contains a binder having a refractive index in the range from 1.57 to 2.00.

* * * * *